United States Patent
Zou

(10) Patent No.: US 12,092,801 B2
(45) Date of Patent: Sep. 17, 2024

(54) OPTICAL SYSTEM, IMAGING MODULE AND ELECTRONIC DEVICE

(71) Applicant: JIANGXI JINGCHAO OPTICAL CO., LTD., Nanchang (CN)

(72) Inventor: Hairong Zou, Nanchang (CN)

(73) Assignee: JIANGXI JINGCHAO OPTICAL CO., LTD., Nangchang (CN)

( * ) Notice: Subject to any disclaimer, the term of this patent is extended or adjusted under 35 U.S.C. 154(b) by 356 days.

(21) Appl. No.: 17/611,148

(22) PCT Filed: Mar. 16, 2020

(86) PCT No.: PCT/CN2020/079515
§ 371 (c)(1),
(2) Date: Nov. 13, 2021

(87) PCT Pub. No.: WO2021/184164
PCT Pub. Date: Sep. 23, 2021

(65) Prior Publication Data
US 2022/0244511 A1   Aug. 4, 2022

(51) Int. Cl.
*G02B 15/14* (2006.01)
*G02B 13/00* (2006.01)
(Continued)

(52) U.S. Cl.
CPC .... *G02B 15/144113* (2019.08); *G02B 13/009* (2013.01); *G02B 7/021* (2013.01);
(Continued)

(58) Field of Classification Search
CPC .............................. G02B 15/144113
See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

International Search Report dated on Jan. 15, 2020 on International Patent Application PCT/CN2019/110525, filed Jan. 3, 2020, in the name of Jiangxi Jingchao Optical Co. Ltd.

(Continued)

*Primary Examiner* — Joseph P Martinez
(74) *Attorney, Agent, or Firm* — Franklin & Associates International Inc; Matthew F. Lambrinos

(57) ABSTRACT

An optical system (10) includes, successively from an object side to an image side, a first lens unit (110) having a positive refractive power, a second lens unit (120) having a negative refractive power, a third lens unit (130) and a fourth lens unit (140) having a positive refractive power; the positions of the first lens unit (110) and the fourth lens unit (140) are fixed with respect to the imaging surface (S17) of the optical system (10), and the second lens unit (120) and the third lens unit (130) are movable with respect to the first lens unit (110) in the optical axis direction of the optical system (10); when the optical system is zoomed from the short focal end to the long focal end, a distance between the first lens unit (110) and the second lens unit (120) and the distance between the third lens unit (130) and the fourth lens unit (140) increase.

19 Claims, 14 Drawing Sheets

(51) Int. Cl.
  *G02B 7/02* (2021.01)
  *G03B 5/02* (2021.01)
(52) U.S. Cl.
  CPC ........ *G03B 5/02* (2013.01); *G03B 2205/0046* (2013.01); *G03B 2205/0069* (2013.01)

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2009/0086321 | A1* | 4/2009 | Mizuguchi ........... G02B 15/173 359/557 |
| 2010/0254029 | A1 | 10/2010 | Shinohara |
| 2012/0075718 | A1 | 3/2012 | Seo |
| 2014/0063620 | A1 | 3/2014 | Jung et al. |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0307858 | A1 | 10/2017 | Chen |
| 2018/0113282 | A1 | 4/2018 | Tsai |
| 2020/0073092 | A1 | 3/2020 | Chen |
| 2022/0244511 | A1 | 8/2022 | Zou |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| DE | 69833908 T2 | 10/2006 |
| JP | 2008268977 A | 11/2008 |
| JP | 4751732 B2 | 8/2011 |
| JP | 2013235242 A | 11/2013 |
| KR | 1020140135909 A | 11/2014 |
| TW | 200821628 A | 5/2008 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |

(56) References Cited

FOREIGN PATENT DOCUMENTS

| WO | 2021184165 A1 | 9/2021 |
|---|---|---|
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.
International Search Report issued Sep. 9, 2021, on a PCT Application No. PCT/CN2020/079515, filed Mar. 16, 2020.
Office Action issued May 6, 2022, on an Indonesian Application No. 202111054846, filed Nov. 26, 2021.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.

* cited by examiner

OPTICAL SYSTEM, IMAGING MODULE AND ELECTRONIC DEVICE

CROSS REFERENCE TO RELATED APPLICATION

The present application is a national stage, filed under 35 U.S.C. § 371, of International Application No. PCT/CN2020/079515, filed on 16 Mar. 2020, the content of which is incorporated herein by reference in its entirety.

TECHNICAL FIELD

The present disclosure relates to the field of photography, and particularly relates to an optical system, an imaging module, and an electronic device.

BACKGROUND

In recent years, various mobile electronic devices equipped with camera lenses (including various portable information terminals such as digital cameras, smartphones, notebooks computers, tablet computers and the like) have been rapidly growing in popularity. The zoom system has the characteristics of high-quality imaging effect, high zoom ratio and the like. It is originally used in digital cameras or camcorders. Nowadays, more and more small-sized camera units are used in other widely used electronic devices.

In a zoom system, driving mechanisms used to drive the refractive power unit for zooming movement generally occupies a large space, and as the number of refractive power units that need to move independently increases, the number of the driving mechanisms will increase accordingly, which makes it difficult to reduce the size of the system. Therefore, it is often difficult to balance the pursuit of a zoom effect and a miniaturized design at the same time. Therefore, how to further shorten the total length of the optical system to realize miniaturization basing on the premise of realizing a wide range of zoom has become one of the problems that the industry desires to solve at present.

SUMMARY

According to various embodiments of the present disclosure, an optical system is provided.

An optical system includes, successively from an object side to an image side:
  a first lens unit having positive refractive power;
  a second lens unit having negative refractive power;
  a third lens unit having positive refractive power; and
  a fourth lens unit having positive refractive power;
  positions of the first lens unit and the fourth lens unit are fixed with respect to an imaging surface of the optical system, the second lens unit and the third lens unit are movable with respect to the first lens unit along an optical axis direction of the optical system, when the optical system is zoomed from a short focal end to a long focal end, a distance between the first lens unit and the second lens unit increases, and a distance between the third lens unit and the fourth lens unit also increases.

A imaging module includes a photosensitive element and the aforementioned optical system, the photosensitive element is arranged on the image side of the optical system.

An electronic device includes a fixing member and the aforementioned imaging module, the imaging module is provided on the fixing member.

The details of one or more embodiments of the present disclosure are set fourth in the following drawings and description. Other features, purposes and advantages of the present disclosure will become apparent from the description, drawings and claims.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

DETAILED DESCRIPTION OF THE EMBODIMENTS

In order to facilitate the understanding of the present disclosure, the present disclosure will be described more completely hereinafter with reference to the related accompanying drawings. Preferable embodiments of the present disclosure are presented in the accompanying drawings. However, the present disclosure may be embodied in many different forms and is not limited to the embodiments described herein. Rather, these embodiments are provided so that the understanding of the disclosure of the present disclosure will be more thorough and complete.

Figure 1:
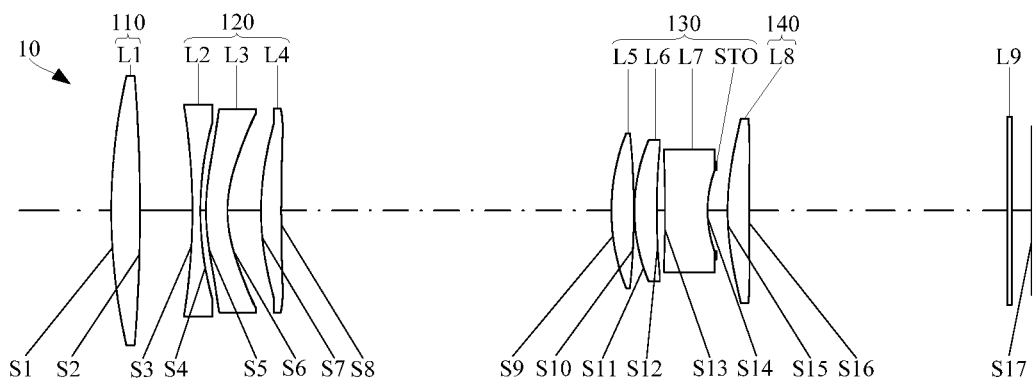
FIG. 1 is a schematic view of the optical system at a short focal end according to a first embodiment of the present disclosure.

Referring to FIG. 1, in some embodiments of the present disclosure, an optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes a first lens L1. The second lens unit 120 includes, successively in order from the object side to the image side, a second lens L2, a third lens L3, and a fourth lens L4. The third lens unit 130 includes, successively in order from the object side to the image side, a fifth lens L5, a sixth lens L6, a seventh lens L7, and a flare stop STO. The fourth lens unit 140 includes an eighth lens L8. Each of the first lens L1 to the eighth lens L8 includes only one lens. In addition, the first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and the eighth lens L8 has a positive refractive power. Each lens in the optical system 10 is coaxially arranged with the flare stop STO, that is, the optical axis of each lens and the center of the flare stop STO are located on the same straight line, and this straight line can be called the optical axis of the optical system 10.

The first lens L1 includes an object side surface S1 and an image side surface S2, the second lens L2 includes an object side surface S3 and an image side surface S4, the third lens L3 includes an object side surface S5 and an image side surface S6, and the fourth lens L4 includes an object side surface S7 and an image side surface S8, the fifth lens L5 includes an object side surface S9 and an image side surface S10, the sixth lens L6 includes an object side surface S11 and an image side surface S12, the seventh lens L7 includes an object side surface S13 and an image side surface S14, and the eighth lens L8 includes an object side surface S15 and an image side surface S16. In addition, the optical system 10 has a virtual imaging surface S17, and the imaging surface S17 is located on the image side of the fourth lens unit 140. Generally, the imaging surface S17 of the optical system 10 coincides with a photosensitive surface of a photosensitive element. To facilitate understanding, when the optical system 10 and the photosensitive element are assembled into an imaging module, the photosensitive surface of the photosensitive element can be regarded as the imaging surface S17, and the effective photosensitive region of the photosensitive surface is the effective imaging region of the imaging surface S17.

In the aforementioned embodiment, the first lens unit 110 and the fourth lens unit 140 are fixed with respect to the imaging surface S17 of the system, and the second lens unit 120 and the third lens unit 130 are movable with respect to the first lens unit 110 along an optical axis direction of the optical system 10, respectively, such that the optical system 10 can achieve an optical zoom. That is, the first lens L1 and the eighth lens L8 always remain fixed in the system, while the second lens L2, the third lens L3, and the fourth lens L4 fixed together by a clamping member can move synchronously along the optical axis direction of the optical system 10 as a whole, while the fifth lens L5, the sixth lens L6, the seventh lens L7, and the flare stop STO fixed together by a clamping member can move synchronously along the optical axis direction of the optical system 10 as a whole. The zoom design enables the optical system 10 to switch between the short focal end and the long focal end. When the optical system 10 is at the short focal end, the system will have a characteristic of large viewing angle; and when the optical system 10 is at the long focal end, the system will have telephoto characteristics. Specifically, when the optical system 10 switches from the short focal end to the long focal end, the second lens unit 120 will be far away from the first lens unit 110, while the third lens unit 130 will also be far away from the fourth lens unit 140, that is, when the short focal end is switched from the short focal end to the long focal end, the second lens unit 120 and the third lens unit 130 will gradually approach.

During the zooming process of the aforementioned optical system 10, the first lens unit 110 closest to the object side and the fourth lens unit 140 closest to the image side remains fixed, and the switching of the system between the short focal end and the long focal end is implemented only via the movement of the second lens unit 120 and the third lens unit 130, so as to reduce the number of the driving mechanisms and make the structure of the system more compact, thereby promoting the miniaturized design of the system and reducing the production cost. Meanwhile, since the zooming is realized by moving the two lens units having opposite refractive power, the optical system 10 can reasonably control the deflection angle of the incident light during the zooming process, and can correct the aberration well, so that a good zooming effect can be obtained. In addition, in the long-term high-temperature or low-temperature environment, the components in periphery of the first lens unit 110 closest to the object side are most affected by the temperature, and it is unnecessary to provide a driving mechanism for the first lens unit 110 in the optical system, such that the driving mechanism in the system the can be prevented from aging and deterioration caused by the external temperature due to the close proximity to the object side, thereby ensuring the normal operation of the zooming function. Meanwhile, the aforementioned optical system 140 does not need to provide a driving mechanism for the fourth lens unit 140, thereby facilitating assembly of the optical system 10 with the photosensitive element on the image side, and avoiding collision of the fourth lens unit 140 with the photosensitive element during the zooming movement.

In the aforementioned embodiment, the object side surfaces and the image side surfaces of the first lens L1, the second lens L2, the fifth lens L5, the sixth lens L6, and the seventh lens L7 are spherical surfaces, and the object side surfaces and the image side surfaces of the third lens L3, the fourth lens L4, and the eighth lens L8 are aspherical surfaces. The manufacturing process of spherical lens is simple and the manufacturing cost is low. The aspherical lens can further help the optical system 10 to eliminate aberration and solve the problem of horizon distortion. Meanwhile, the aspherical lens can also have excellent optical performance under the condition of smaller and thinner structure, thereby facilitating the miniaturization design of the optical system 10. The system can balance between miniaturization, high image quality, and low cost via the reasonable collocation of the spherical lens and the aspheric lens. Of course, in some embodiments, the object side surface of any lens in the optical system 10 may be spherical or aspheric, and the image side surface of any lens may be spherical or aspheric. It should be noted that the specific shapes of the spherical and aspheric surfaces in the embodiments are not limited to the shapes of the spherical and aspheric surfaces shown in the drawings, which are mainly for example reference and not drawn strictly to scale. In particular, when the lens closest to the image side in the system is reasonably designed as an aspherical lens, the lens effectively corrects the aberration generated by each lens on the object side, thereby facilitating the system to maintain high image quality.

For surface type calculation of aspheric surface, please refer to aspheric surface formula:

$$Z = \frac{cr^2}{1+\sqrt{1-(k+1)c^2r^2}} + \sum_i A_i r^i$$

where Z is the distance from the corresponding point on the aspheric surface to the plane tangent to the surface apex, r is the distance from the corresponding point on the aspheric surface to the optical axis, c is the curvature of the aspheric surface apex, k is the conical coefficient, and Ai is the coefficient corresponding to the i th higher order term in the aspheric surface type formula.

It should be noted that, in some embodiments, when the object side surface or image side surface of a lens is aspherical, and the surface may have a structure of an integral convex surface or an integral concave surface; or, the surface may also be designed to have a structure with reflective points in which the surface type of the surface from the center to the edge is changed, e.g. the surface is convex at the center and concave at the edge. It should be noted that, when the embodiment of the present disclosure describes that a side surface of the lens is convex at a paraxial position (a central region of the side surface), it can be understood that the side surface of the lens is convex in a region near the optical axis; when a side surface of the lens is described as concave at a circumference position, it is understood that the side surface is concave in a region near the maximum effective half aperture. For example, when the side surface is convex at the paraxial position and also convex at a circumference position, the side surface may have a shape of a pure convex surface in a direction from the center (at the optical axis) to the edge; or transit from a convex shape to a concave shape in the center, and then becomes convex shape near the maximum effective half aperture. The above is just an example to illustrate the relationship between the location near the axis and the location at a circumference position, the various shapes and structures of the side surface (concave-convex relationship) are not fully embodied, but other cases may be derived from the above examples and shall be considered as described herein. In some embodiments, all the spherical lenses (the lenses having both the object side surface and the image side surface being spherical) in the optical system 10 are made of glass, and all the aspheric lenses (at least one of the object side surface and the image side surface being aspheric) are made of plastic. In some embodiments, each lens in the optical system 10 is made of glass. In other embodiments, each lens in the optical system 10 is made of plastic. The lens made of glass can withstand a high temperature and has an excellent optical effect, and the lens made of plastic can reduce the weight of the optical system 10 and reduce the manufacturing cost. In other embodiments, the first lens L1 is made of glass, and the other lenses in the optical system 10 are made of plastic. In this case, since the lenses close to the object side in the optical system 10 are made of glass, these glass lenses close to the object side have a good resistance effect to the extreme environment, and are not susceptible to the influence of the object side environment, resulting in aging and the like. Therefore, when the optical system 10 is exposed to high temperature and other extreme environments, the optical performance and the production cost of the system can be well balanced. Of course, the lens material arrangement relationship in the optical system 10 is not limited to the aforementioned embodiment, and any lens in the system may be made of plastic or glass.

In some embodiments, the optical system 10 further includes an infrared cut filter L9 provided on an image side of the fourth lens unit 140 and fixedly arranged with respect to the first lens unit 110 and the fourth lens unit 140. The infrared cut filter L9 is used to filter out infrared light and prevent the infrared light from reaching the imaging surface S17 of the system, thereby preventing the infrared light from interfering with normal imaging. The infrared cut filter L9 may be assembled with each lens as a part of the optical system 10. In other embodiments, the infrared cut filter L9 does not belong to an element of the optical system 10, and the infrared cut filter L9 may be mounted between the optical system 10 and the photosensitive element when the optical system 10 and the photosensitive element are assembled into the imaging module. In some embodiments, the infrared cut filter L9 may also be arranged on the object side of the first lens L1. In addition, in some embodiments, the infrared cut filter L9 may be omitted, but an infrared filter film may be provided on any of the first to fifth lenses L1 to L5 to realize the effect of filtering infrared light. By providing the infrared cut filter L9 or providing the infrared filter film on the lens surface, it is possible to avoid the phenomenon of false color or ripple caused by the interference of infrared light in the imaging, and meanwhile, improve the effective resolution and color reduction.

In some embodiments, the first lens unit 110 and the fourth lens unit 140 include but are not limited to one lens, and the second lens unit 120 and the third lens unit 130 include but are not limited to three lenses.

In some embodiments, the optical system 10 also satisfies the following condition:

$1.2 < fc/fd < 3.5$; where fc is the focal length when the optical system 10 is at the long focal end, and fd is a focal length of the optical system 10 at the short focal end. In some embodiments, the fc/fd is 1.50, 1.60, 1.80, 2.00, 2.20, 2.50, 2.80, or 3.00. When the aforementioned condition is satisfied, a focal length of the optical system 10 at the long focal end and the short focal end can be reasonably configured, so that the zooming process is more reasonable and appropriate, thereby facilitating the optical system 10 to have excellent zooming effect and miniaturization characteristics. When fc/fd>3.5, it is disadvantageous to correct the spherical aberration at the long focal end of the system, and causes the moving distance of the lens unit to be too large when the system is switched from long focal to short focal, so that the miniaturization design cannot be realized; when fc/fd<1.2, the zooming ratio of the system is too low to realize significant zooming effect.

$0.3 < (g1+g2+g3+g4)/fd$; where g1 is a distance between a lens surface closest to the object side and a lens surface closest to the image side in the first lens unit 110 on the optical axis, g2 is a distance between a lens surface closest to the object side and a lens surface closest to the image side in the second lens unit 120 on the optical axis, g3 is a distance between a lens surface closest to the object side and a lens surface closest to the image side in the third lens unit 130 on the optical axis, g4 is a distance between a lens surface closest to the object side and a lens surface closest to the image side in the fourth lens unit 140 on the optical axis, and fd is the focal length of the optical system 10 at the short focal end. In some embodiments, The (g1+g2+g3+g4)/fd is 0.45-0.50 0.60-0.70-0.80 or 0.85. When the aforementioned condition is satisfied, it is advantageous for the optical system 10 to realize miniaturization of the entire system while having a zoom function. When (g1+g2+g3+g4)/fd<0.3, it is disadvantageous to correct the aberration of the system, and the processing cost will be increased because the total length of the system is too short resulting in the a reduce in the thickness of each lens.

$0.8 < f3/fd < 2$; where f3 is a focal length of the third lens unit 130, and fd is the focal length of the optical system 10 at the short focal end. In some embodiments, the f3/fd is 1.00, 1.10, 1.20, 1.40, 1.50, 1.60, 1.70 or 1.80. When the aforementioned condition is satisfied, it can be ensured that the third lens unit 130 provides an appropriate refractive force for the entire optical system 10 and facilitates the system to obtain a miniature size.

$1.6 < F1/|f2| < 2.3$; where f1 is a focal length of the first lens unit 110 and f2 is a focal length of the second lens unit 120. In some embodiments, the f1/|f2| is 1.80, 1.90, 2.00, 2.10 or 2.15. When the aforementioned condition is satisfied, the refractive power of the first lens unit 110 and the second lens unit 120 can be reasonably configured, so that the distortion generated by the first lens unit 110 can be effectively corrected, and thereby facilitating the miniaturization design of the system. When f1/|f2|>2.3, the refractive power of the first lens unit 110 is too strong to correct the distortion generated by the first lens unit 110; when f1/|f2|<1.6, the refractive power of the first lens unit 110 is too weak to effectively deflect the incident light, resulting in an increase in the action distance of the light, which is not conducive to the miniaturization of the entire optical system 10.

$-0.6 < F2/fc < -0.3$; where f2 is the focal length of the second lens unit 120, and fc is the focal length of the optical system 10 at the long focal end. In some embodiments, the f2/fc is −0.50, −0.49, −0.47, −0.45 or −0.43. When the aforementioned condition is satisfied, the focal length of the second lens unit 120 and the focal length of the system corresponding to the long focal end can be reasonably configured, so as to ensure that the system can reasonably implement zooming, that is, the moving distance of the system during the zooming process is smaller, the zoom time is shorter, and the zooming is less affected by the external environment, so that fast and efficient zoom can be realized. Meanwhile, it is advantageous to correct the spherical aberration generated by the second lens unit 120 when the aforementioned condition is satisfied.

$0.1 < d2/d3 < 0.6$; where d2 is a moving distance of the second lens unit 120 when the optical system 10 is zoomed from the short focal end to the long focal end, and d3 is a moving distance of the third lens unit 130 when the optical system 10 is zoomed from the short focal end to the long focal end. In some embodiments, the d2/d3 is 0.25, 0.30, 0.35, 0.40, 0.45 or 0.50. When the aforementioned condition is satisfied, it is advantageous to miniaturize the optical system 10, and meanwhile the zooming process becomes more reasonable, that is, the moving distance of the system during the zooming process is smaller, the zoom time is shorter, and the zooming process is less affected by the external environment, so that fast and efficient zoom can be realized.

$1 < TTL/fc < 1.5$; where TTL is a total optical length of the optical system 10, and fc is the focal length of the optical system 10 at the long focal end. In some embodiments, the TTL/fc is 1.15, 1.20, 1.25, 1.30, 1.35 or 1.40. When the aforementioned condition is satisfied, the total optical length of the system and the focal length corresponding to the long focal end of the system can be reasonably configured, so that the optical system 10 can be further miniaturized on the basis of broadening the zoom range.

0.3<R16/f4<0.8; where R16 is a curvature radius of the object side surface S15 of the eighth lens L8 at the optical axis, and f4 is a focal length of the fourth lens unit 140. In some embodiments, the R16/f4 is 0.40, 0.43, 0.45, 0.50, 0.55, 0.58, 0.60 or 0.62. When the aforementioned condition is satisfied, the curvature radius of the object side surface S15 of the eighth lens L8 and the focal length of the fourth lens unit 140 are reasonably configured, thereby facilitating correction of aberration and improving image quality. When R16/f4<0.3, the curvature radius of the object side surface S15 of the eighth lens L8 is too small, resulting in a complex surface shape of the surface and an increased the processing difficulty.

In some embodiments, the optical system 10 has only a long focal end position and a short focal end position, i.e. the system can only switch between these two positions. In some embodiments, the optical system 10 also has a middle focal end position, where the system can switch among the three positions of the long focal end, the middle focal end and the short focal end. The focal length of the optical system 10 at the long focal end is greater than that at the middle focal end, and a focal length of the optical system 10 at the middle focal end is greater than that at the short focal end. The switching between the aforementioned different focal lengths is realized by the zooming movement of the second lens unit 120 and the third lens unit 130. In some embodiments, however, it should be noted that, the optical system 10 is not only capable of switching between the aforementioned two or three focal lengths, and in these embodiments, the second lens unit 120 and the third lens unit 130 can remain stationary at any reasonable position within the range of movement, thereby allowing the optical system 120 to have the capability of continuously zoom and thus having more focal length choices.

In some embodiments, the zoom effect may be realized by providing driving mechanisms such as a voice coil motor, a magnet and the like on the second lens unit 120 and the third lens unit 130, respectively, to enable the two to move independently. Specifically, in some embodiments, each lens in the second lens unit 120 is mounted in a lens barrel provided with a coil electrically connected to the driving chip, and meanwhile, a magnet corresponding to the coil is provided in the optical system 10, and the movement of the lens barrel is driven by a magnetic force between the coil and the magnet after energization. Similarly, each of the lenses and the flare stop STO in the third lens unit 130 is mounted in another lens barrel provided with a coil electrically connected to a driving chip, and meanwhile, a magnet corresponding to the coil is provided in the optical system 10, and the lens barrel is driven by a magnetic force between the coil and the magnet after energization.

Hereafter, the optical system 10 of the present disclosure will be described with more specific and detailed embodiments:

First Embodiment

Figure 2:
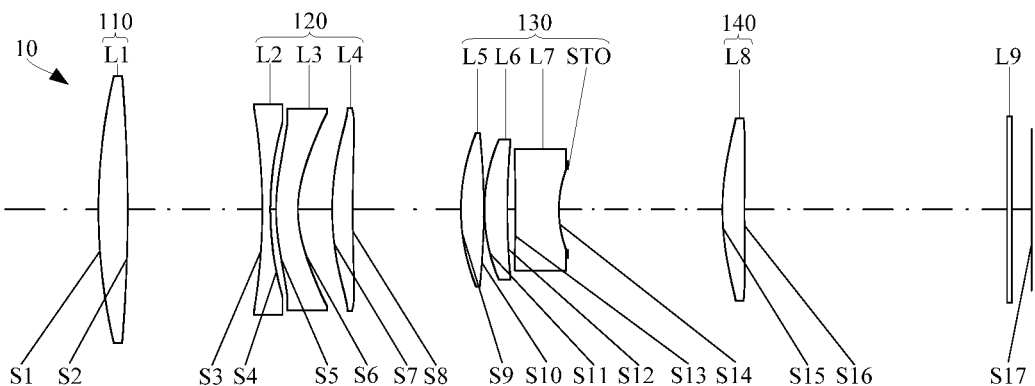
FIG. 2 is a schematic view of the optical system at a middle focal end according to the first embodiment of the present disclosure.
Figure 3:
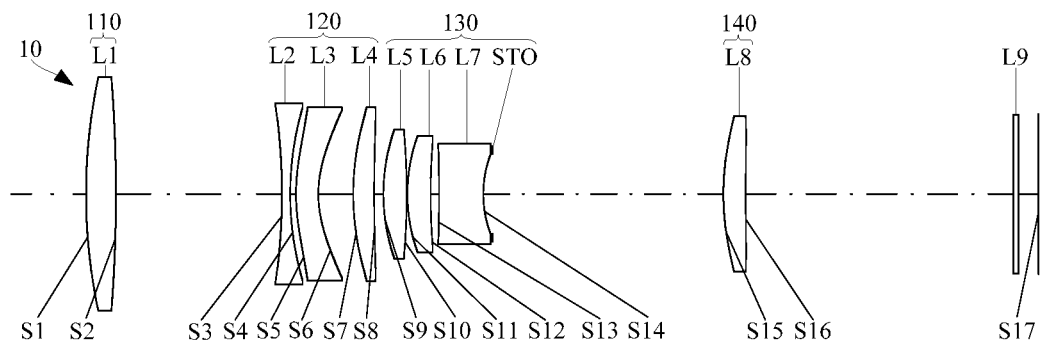
FIG. 3 is a schematic view of the optical system at a long focal end according to the first embodiment of the present disclosure.

Referring to FIGS. 1, 2 and 3, in the first embodiment, the optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes a first lens L1, the second lens unit 120 includes, successively in order from the object side to the image side, a second lens L2, a third lens L3, and a fourth lens L4, and the third lens unit 130 includes, successively in order from the object side to the image side, a fifth lens L5, a sixth lens L6, a seventh lens L7, and a flare stop STO, the fourth lens unit 140 includes an eighth lens L8, and each of the first lens L1 to the eighth lens L8 includes only one lens. The first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and eighth lens L8 has a positive refractive power. The first lens unit 110 and the fourth lens unit 140 are fixedly arranged with respect to an imaging surface of the optical system 120, the optical zoom is realized by movement of the second lens unit 120 and the third lens unit 130.

During the zooming process, the first lens L1 and the eighth lens L8 always remain fixed in the system, while the second lens L2, the third lens L3, and the fourth lens L4 can be fixed together by a clamping member and move synchronously along the optical axis direction of the optical system 10 as a whole, the fifth lens L5, the sixth lens L6, the seventh lens L7 and the flare stop STO can be fixed together by a clamping member and move synchronously along the optical axis direction of the optical system 10 as a whole. When the optical system 10 gradually switches from the short focal end to the long focal end, the second lens unit 120 will be far away from the first lens unit 110, while the third lens unit 130 will also be far away from the fourth lens unit 140.

During the zooming process of the aforementioned optical system 10, the first lens unit 110 closest to the object side and the fourth lens unit 140 closest to the image side are kept fixed, and the switching of the system between the short focal end and the long focal end is implemented only via the movement of the second lens unit 120 and the third lens unit 130, so as to reduce the number of the driving mechanisms and make the structure of the system more compact, thereby promoting the miniaturized design of the system and reducing the production cost. Meanwhile, since the zoom is realized by moving the two lens units with opposite refractive power, the optical system 10 can control the deflection angle of the incident light during the zooming process reasonably, and can correct the aberration well, so that a good zoom effect can be obtained. In addition, in the long-term high-temperature or low-temperature environment, the components at a circumference position of the first lens unit 110 closest to the object side are most affected by the temperature, and it is unnecessary to provide a driving mechanism for the first lens unit 110 in the optical system, so that the deterioration of the driving mechanism in the system due to the influence of the outside temperature for being too close to the object side can be prevented, thereby ensuring the normal operation of the zoom function. Meanwhile, the aforementioned optical system 140 does not need to provide a driving mechanism for the fourth lens unit 140, thereby facilitating assembly of the optical system 10 with the photosensitive element on the image side, and avoiding collision of the fourth lens unit 140 with the photosensitive element during the zooming movement.

Figure 4:
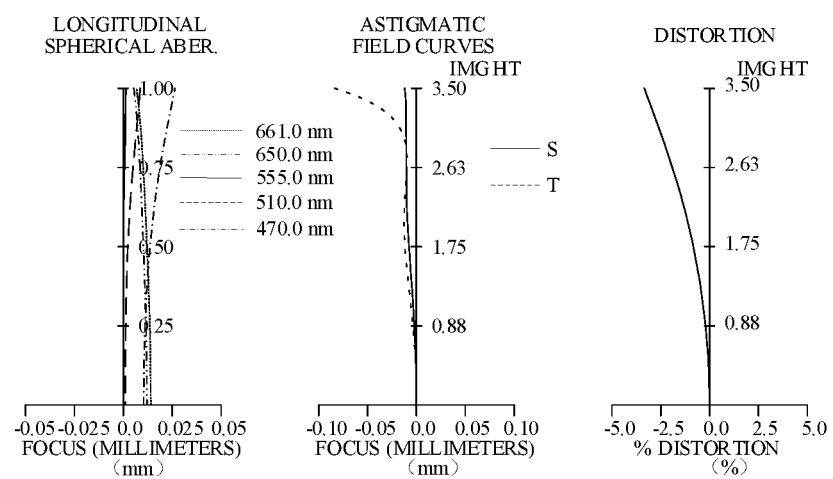
FIG. 4 is a longitudinal spherical aberration diagram, an astigmatism diagram, and a distortion diagram of the optical system at the short focal end corresponding to FIG. 1 according to the first embodiment.
Figure 5:
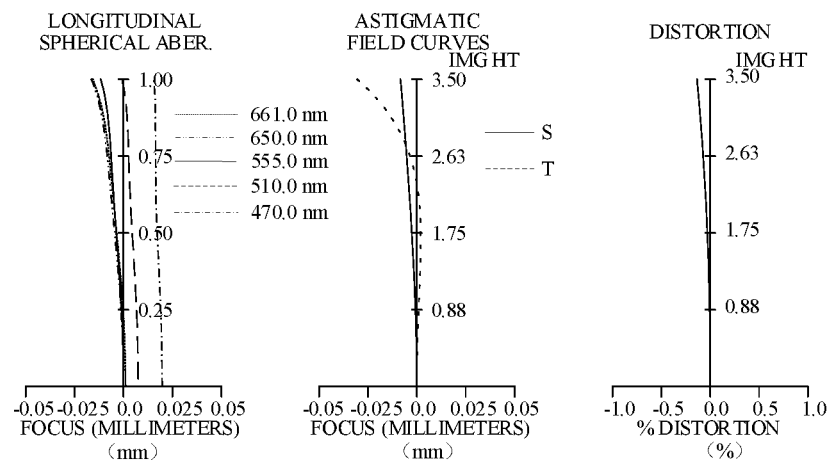
FIG. 5 is a longitudinal spherical aberration diagram, an astigmatism diagram, and a distortion diagram of the optical system at the middle focal end corresponding to FIG. 2 according to the first embodiment.
Figure 6:
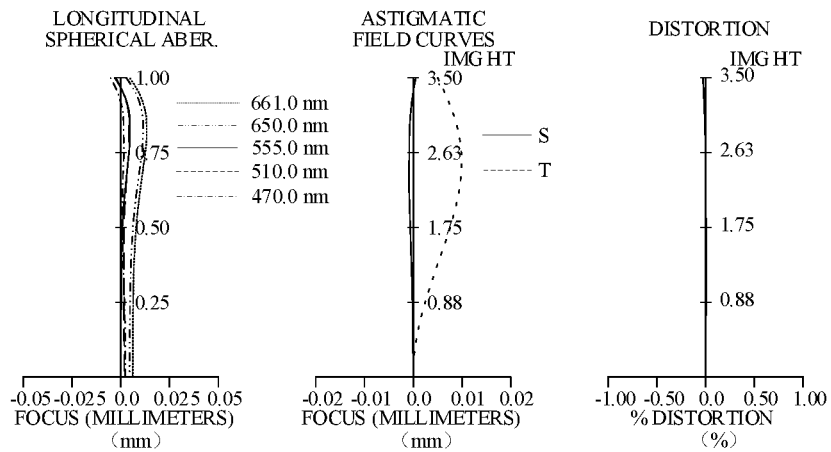
FIG. 6 is a longitudinal spherical aberration diagram, an astigmatism diagram, and a distortion diagram of the optical system at the long focal end corresponding to FIG. 3 according to the first embodiment.

FIG. 1 is a schematic view of the optical system 10 at a short focal end according to the first embodiment; FIG. 2 is a schematic view of the optical system 10 at a middle focal end according to the first embodiment; FIG. 3 is a schematic view of the optical system 10 at a long focal end according to the first embodiment. FIG. 4 is a longitudinal spherical aberration diagram (mm), an astigmatism diagram (mm) and a distortion diagram (%) when the optical system 10 is at the corresponding short focal end of FIG. 1; FIG. 5 is a longitudinal spherical aberration diagram (mm), an astigmatism diagram (mm), and a distortion diagram (mm) at the corresponding middle focal end of FIG. 2; FIG. 6 is a longitudinal spherical aberration diagram (mm), an astigmatism diagram (mm), and a distortion diagram (mm) at the corresponding long focal end of FIG. 3. The ordinate of each astigmatism diagram and distortion diagram has a length of half of the diagonal length of the imaging surface S17 of the optical system 10 from the effective imaging region, in mm. Further, the astigmatism diagram and the distortion diagram in the following embodiments are graphs at 555 nm wavelengths.

The aforementioned FIGS. 1, 2 and 3 show the positional relationship of the lenses of the optical system 10 at the short focal end, the middle focal end and the long focal end, respectively. The optical system 10 includes, but is not limited to, switching between the aforementioned three focal length states. The focal length of the optical system 10 at the long focal end is greater than that at the middle focal end, and the focal length of the optical system 10 at the middle focal end is greater than that at the short focal end.

The object side surface S1 of the first lens L1 is convex at a paraxial position, and the image side surface S2 is convex at the paraxial position; the object side surface S1 is convex at a circumference position, and the image side surface S2 is convex at a circumference position.

The object side surface S3 of the second lens L2 is concave at the paraxial position, and the image side surface S4 is concave at the paraxial position; the object side surface S3 is concave at a circumference position, and the image side surface S4 is concave at a circumference position.

The object side surface S5 of the third lens L3 is convex at the paraxial position, and the image side surface S6 is concave at the paraxial position; the object side surface S5 is concave at a circumference position, and the image side surface S6 is concave at a circumference position.

The object side surface S7 of the fourth lens L4 is convex at the paraxial position, and the image side surface S8 is concave at the paraxial position; the object side surface S7 is convex at a circumference position, and the image side surface S8 is convex at a circumference position.

The object side surface S9 of the fifth lens L5 is convex at the paraxial position, and the image side surface S10 is convex at the paraxial position; the object side surface S9 is convex at a circumference position, and the image side surface S10 is convex at a circumference position.

The object side surface S11 of the sixth lens L6 is convex at the paraxial position, and the image side surface S12 is concave at the paraxial position; the object side surface S11 is convex at a circumference position, and the image side surface S12 is concave at a circumference position.

The object side surface S13 of the seventh lens L7 is concave at the paraxial position, and the image side surface S14 is concave at the paraxial position; the object side surface S13 is concave at a circumference position, and the image side surface S14 is concave at a circumference position.

The object side surface S15 of the eighth lens L8 is convex at the paraxial position, and the image side surface S16 is concave at the paraxial position; the object side surface S15 is convex at a circumference position, and the image side surface S16 is convex at a circumference position.

The object side surfaces and the image side surfaces of the first lens L1, the second lens L2, the fifth lens L5, the sixth lens L6, and the seventh lens L7 are spherical surfaces. The object side surfaces and the image side surfaces of the third lens L3, the fourth lens L4, and the eighth lens L8 are spherical surfaces. The first lens L1, the second lens L2, the fifth lens L5, the sixth lens L6, and the seventh lens L7 are made of glass, and the lens made of glass can withstand extreme temperatures and has an excellent stable optical effect. The third lens L3, the fourth lens L4, and the eighth lens L8 are made of plastic.

During the zooming process of the aforementioned optical system 10, the first lens unit 110 closest to the object side and the fourth lens unit 140 closest to the image side are kept fixed, and the switching of the system between the short focal end and the long focal end is implemented only via the movement of the second lens unit 120 and the third lens unit 130, so as to reduce the number of the driving mechanisms and make the structure of the system more compact, thereby promoting the miniaturized design of the system and reducing the production cost. Meanwhile, since the zoom is realized by moving the two lens units with opposite refractive power, the optical system 10 can control the deflection angle of the incident light during the zooming process reasonably, and can correct the aberration well, so that a good zoom effect can be obtained. In addition, in the long-term high-temperature or low-temperature environment, the components at a circumference position of the first lens unit 110 closest to the object side are most affected by the temperature, and it is unnecessary to provide a driving mechanism for the first lens unit 110 in the optical system, so that the deterioration of the driving mechanism in the system due to the influence of the outside temperature for being too close to the object side can be prevented, thereby ensuring the normal operation of the zoom function. Meanwhile, the aforementioned optical system 140 does not need to provide a driving mechanism for the fourth lens unit 140, thereby facilitating assembly of the optical system 10 with the photosensitive element on the image side, and avoiding collision of the fourth lens unit 140 with the photosensitive element during the zooming movement.

In the first embodiment, the optical system 10 also satisfies the following condition:

$fc/fd=2.32$; where fc is the focal length when the optical system 10 is at the long focal end, and fd is the focal length of the optical system 10 at the short focal end. When the aforementioned condition is satisfied, the focal length of the optical system 10 at the long focal end and the short focal end can be reasonably configured, so that the zooming process is more reasonable and appropriate, thereby facilitating the optical system 10 to have excellent zoom effect and miniaturization characteristics.

$(g1+g2+g3+g4)/fd=0.81$; where g1 is the distance between the lens surface closest to the object side and the lens surface closest to the image side in the first lens unit 110 on the optical axis, g2 is the distance between the lens surface closest to the object side and the lens surface closest to the image side in the second lens unit 120 on the optical axis, g3 is the distance between the lens surface closest to the object side and the lens surface closest to the image side in the third lens unit 130 on the optical axis, g4 is the distance between the lens surface closest to the object side and the lens surface closest to the image side in the fourth lens unit 140 on the optical axis, and fd is the focal length of the optical system 10 at the short focal end. When the aforementioned condition is satisfied, it is advantageous for the optical system 10 to realize miniaturization of the entire system while having a zoom function.

$f3/fd=1.51$; where f3 is the focal length of the third lens unit 130, and fd is the focal length of the optical system 10 at the short focal end. When the aforementioned condition is satisfied, it can be ensured that the third lens unit 130 provides an appropriate refractive force for the entire optical system 10 and facilitates the system to obtain a miniature size.

f1/|f2|=2.17; where f1 is the focal length of the first lens unit 110 and f2 is the focal length of the second lens unit 120. When the aforementioned condition is satisfied, the refractive power of the first lens unit 110 and the second lens unit 120 can be reasonably configured, so that the distortion generated by the first lens unit 110 can be effectively corrected, and thereby facilitating the miniaturization design of the system.

f2/fc=−0.46; where f2 is the focal length of the second lens unit 120, and fc is the focal length of the optical system 10 at the long focal end. When the aforementioned condition is satisfied, the focal length of the second lens unit 120 and the focal length of the system corresponding to the long focal end can be reasonably configured, thereby ensuring that the system can reasonably implement zooming, that is, the moving distance of the system during the zooming process is smaller, the zoom time is shorter, and the zoom is less affected by the external environment, thereby realizing fast and efficient zoom, and meanwhile, facilitating correction of the spherical aberration generated by the second lens unit 120.

d2/d3=0.51; where d2 is the moving distance of the second lens unit 120 when the optical system 10 is zoomed from the short focal end to the long focal end, and d3 is the moving distance of the third lens unit 130 when the optical system 10 is zoomed from the short focal end to the long focal end. When the aforementioned condition is satisfied, it is advantageous to miniaturize the optical system 10, and meanwhile, make the zooming process more reasonable, that is, the moving distance of the system during the zooming process is smaller, the zoom time is shorter, and the zooming process is less affected by the external environment, so that fast and efficient zoom can be realized.

TTL/fc=1.37; where TTL is the total optical length of the optical system 10, and fc is the focal length of the optical system 10 at the long focal end. When the aforementioned condition is satisfied, the total optical length of the system and the focal length corresponding to the long focal end of the system can be reasonably configured, such that the optical system 10 can be further miniaturized on the basis of broadening the zoom range.

R16/f4=0.50; where R16 is the curvature radius of the object side surface S15 of the eighth lens L8 at the optical axis, and f4 is the focal length of the fourth lens unit 140. When the aforementioned condition is satisfied, the curvature radius of the object side surface S15 of the eighth lens L8 and the focal length of the fourth lens unit 140 are reasonably configured, thereby facilitating correction of aberration and improving image quality.

The short focal end and the long focal end of the aforementioned relationship of the first embodiment correspond to the system state shown in FIGS. 1 and 3, respectively, but do not mean that each lens unit can only be adjusted to positions of the short focal end and the long focal end.

In addition, the lens parameters of the optical system 10 are given in Table 1, Table 2, and Table 3. The elements from the object side to the image side are arranged successively in the order of the elements from the top to the bottom in Table 1, where the photography object located on the object surface can form a clear image on the image surface (imaging surface S17) of the optical system 10, and the imaging surface S17 can also be understood as the photosensitive surface of the photosensitive element at the later stage of assembly. Surface numbers 1 and 2 denote an object side surface S1 and an image side surface S2 of the first lens L1, respectively, that is, in the same lens, a surface having a smaller surface number is an object side surface, and a surface having a larger surface number is an image side surface. The Y radius in Table 1 is the curvature radius of the object side surface or image side surface of the corresponding surface number on the optical axis. The first value of the lens in the "thickness" parameter column is the thickness of the lens on the optical axis, and the second value is the distance from the image side surface of the lens to the object side surface of the latter optical element (lens or flare stop STO) on the optical axis. The value of the flare stop STO in the "thickness" parameter column is the distance from the flare stop STO to the object side of the next lens on the optical axis. The center of the optical axis-stage flare stop STO of each lens is located on the same straight line as the optical axis of the optical system 10. D1 in the table is a distance between the first lens unit 110 and the second lens unit 120 on the optical axis, that is, the distance between the image side surface S2 of the first lens L1 and the object side surface S3 of the second lens L2 on the optical axis; D2 is a distance between the second lens unit 120 and the third lens unit 130 on the optical axis, that is, the distance between the image side surface S8 of the fourth lens L4 and the object side surface S9 of the fifth lens L5 on the optical axis; D3 is a distance between the third lens unit 130 and the fourth lens unit 140 on the optical axis, that is, the distance between the image side surface S14 of the seventh lens L7 and the object side surface S15 of the eighth lens L8 on the optical axis.

FIGS. 1 to 3 show lens position states at three different focal lengths of the system in the first embodiment, respectively, a short focal end position shown in FIG. 1, a middle focal end position shown in FIG. 2, and a long focal end position shown in FIG. 3. The optical system 10 has a focal length fd=12.9 mm, an f-number FNOd=3.85, and a maximum field angle in the diagonal direction FOVd=11.69° at the short focal end; the optical system 10 has a focal length fz=23.30 mm, an f-number FNOz=4.63, and a maximum field angle in the diagonal direction FOVz=6.42° at the middle focal end; the optical system 10 has a focal length fc=29.90 mm, an f-number FNOc=5.02, and a maximum field angle in the diagonal direction FOVc=5.01° at the long focal end. For the corresponding tables of the following embodiments, among the three values given by the focal length f, the f-number FNO, and the diagonal maximum field angle FOV of the system, the values of the system at the short focal end, the middle focal end, and the long focal end are arranged successively from left to right. The optical total length of the optical system 10 is TTL=41 mm, which is the distance from the object side surface S1 of the first lens L1 to the imaging surface S17 of the system on the optical axis. In some embodiments, the infrared cut filter L9 in Table 1 does not belong to the element of the optical system 10, in which case the total optical length TTL of the optical system 10 is still 41 mm, and the distance from the image side surface S16 to the imaging surface S17 in the eighth lens L8 is still 12.60 mm Table 2 shows the values of D1, D2, and D3 at the short focal end, the middle focal end, and the long focal end of the optical system 10, and the unit of value is mm K in Table 3 is the conical coefficient, and Ai is the coefficient corresponding to the i th higher order term in the aspheric surface type formula.

Further, in the following embodiments (first to fifth embodiments), the refractive index, Abbe number, and focal length of each lens are values at the wavelength of 587.56 nm. Further, the relational formula calculation and the lens structure of each embodiment are based on the lens parameters (corresponding to the parameter data in Table 1, Table 2, and Table 3 of the first embodiment).

TABLE 1

First Embodiment
F = 12.9 mm~23.30 mm~29.90 mm, FNO = 3.85~4.63~5.02,
FOV = 11.69°~6.42°~5.01°, TTL = 41 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| | Object Surface | Spherical surface | Infinite | Infinite | | | | |
| 1 | First Lens | Spherical Surface | 25.2905 | 1.2835 | Glass | 1.618 | 63.39 | 29.968211 |
| 2 | | Spherical Surface | −68.5775 | D1 | | | | |
| 3 | Second Lens | Spherical Surface | −27.3535 | 0.3540 | Glass | 1.755 | 27.58 | −11.960652 |
| 4 | | Spherical Surface | 13.6942 | 0.2523 | | | | |
| 5 | Third Lens | Aspheric Surface | 8.6676 | 0.9606 | Plastic | 1.544 | 56.11 | −25.347396 |
| 6 | | Aspheric Surface | 5.1209 | 1.5042 | | | | |
| 7 | Fourth Lens | Aspheric Surface | 12.2059 | 0.8998 | Plastic | 1.671 | 19.24 | 21.269065 |
| 8 | | Aspheric Surface | 77.4040 | D2 | | | | |
| 9 | Fifth Lens | Spherical Surface | 8.7959 | 1.0000 | Glass | 1.618 | 63.39 | 11.252535 |
| 10 | | Spherical Surface | −32.2079 | 0.0300 | | | | |
| 11 | Sixth Lens | Spherical Surface | 7.6365 | 1.0000 | Glass | 1.658 | 50.88 | 15.177776 |
| 12 | | Spherical Surface | 30.3382 | 0.3657 | | | | |
| 13 | Seventh Lens | Spherical Surface | −61.8517 | 1.9000 | Glass | 1.717 | 29.62 | −6.310038 |
| 14 | | Spherical Surface | 4.9794 | 0.3981 | | | | |
| 15 | Flare Stop | Spherical Surface | Infinite | D3 | | | | |
| 16 | Eighth Lens | Aspheric Surface | 11.5589 | 0.9633 | Plastic | 1.544 | 56.11 | 23.29038 |
| 17 | | Aspheric Surface | 123.3922 | 11.5277 | | | | |
| 18 | Infrared Cut Filter | Spherical Surface | Infinite | 0.2100 | Glass | 1.517 | 64.17 | |
| 19 | | Spherical Surface | Infinite | 0.8634 | | | | |
| | Image Surface | Spherical Surface | Infinite | 0.0000 | | | | |

TABLE 2

| Variable Distance | Short Focal Position | Middle Focal Position | Long Focal Position |
|---|---|---|---|
| D1 | 2.3370 | 5.9054 | 7.1494 |
| D2 | 14.7505 | 4.7507 | 0.4000 |
| D3 | 0.5000 | 6.7813 | 9.9381 |

TABLE 3

| Surface Number | 5 | 6 | 7 | 8 | 16 | 17 |
|---|---|---|---|---|---|---|
| K | 0.00E+00 | 0.00E+00 | 0.00E+00 | 0.00E+00 | 0.00E+00 | 0.00E+00 |
| A4 | −2.23E−03 | −3.07E−03 | −1.10E−04 | −2.00E−04 | −2.50E−04 | −1.60E−04 |
| A6 | 2.00E−05 | 1.00E−05 | 2.00E−05 | 2.00E−05 | −1.00E−05 | −2.00E−05 |
| A8 | 0.00E+00 | 0.00E+00 | 0.00E+00 | 0.00E+00 | 0.00E+00 | 0.00E+00 |
| A10 | 0.00E+00 | 0.00E+00 | 0.00E+00 | 0.00E+00 | 0.00E+00 | 0.00E+00 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

Second Embodiment

Figure 7:
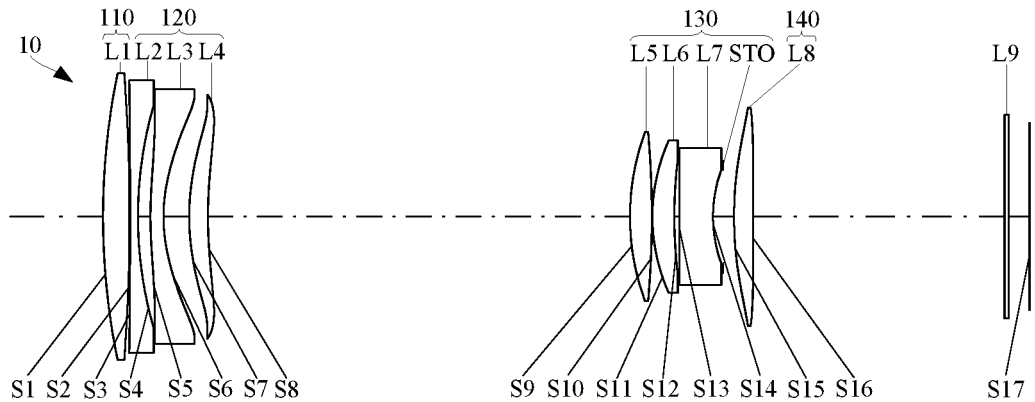
FIG. 7 is a schematic view of the optical system at the short focal end according to a second embodiment of the present disclosure.
Figure 8:
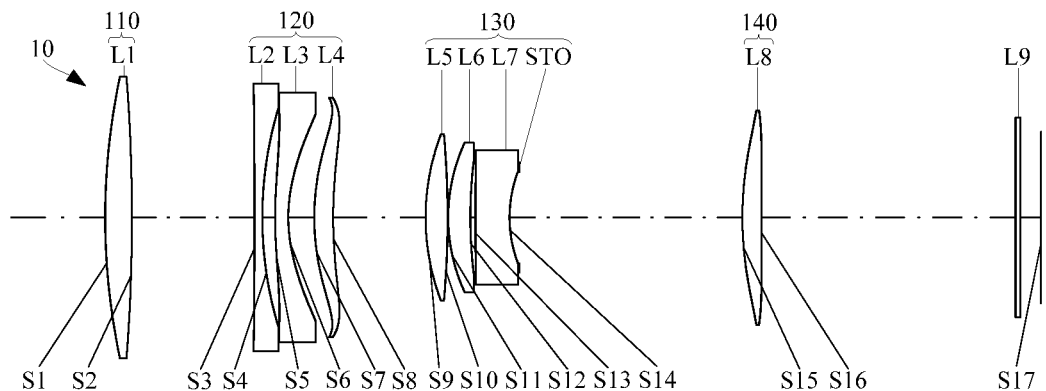
FIG. 8 is a schematic view of the optical system at the middle focal end according to the second embodiment of the present disclosure.
Figure 9:
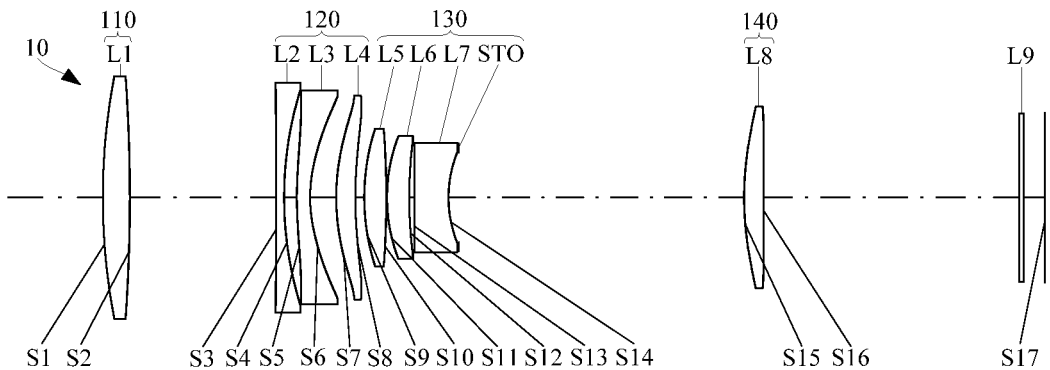
FIG. 9 is a schematic view of the optical system at the long focal end according to the second embodiment of the present disclosure.

Referring to FIGS. 7, 8 and 9, in the second embodiment, the optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes, successively in order from the object side to the image side, a first lens L1, the second lens unit 120 includes a second lens L2, a third lens L3, and a fourth lens L4, and the third lens unit 130 includes, successively in order from the object side to the image side, a fifth lens L5, a sixth lens L6, a seventh lens L7, and a flare stop STO, the fourth lens unit 140 includes an eighth lens L8, and each of the first lens L1 to the eighth lens L8 includes only one lens. The first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and the eighth lens L8 has a positive refractive power. The first lens unit 110 and the fourth lens unit 140 are fixedly arranged with respect to the imaging surface of the optical system 120, the optical zoom is realized via movement of the second lens unit 120 and the third lens unit 130.

During the zooming process, the first lens L1 and the eighth lens L8 always remain fixed in the system, while the second lens L2, the third lens L3, and the fourth lens L4 can be fixed together by a clamping member and move synchronously along the optical axis direction of the optical system 10 as a whole, the fifth lens L5, the sixth lens L6, the seventh lens L7 and the flare stop STO can be fixed together by a clamping member and move synchronously along the optical axis direction of the optical system 10 as a whole. When the optical system 10 gradually switches from the short focal end to the long focal end, the second lens unit 120 will be far away from the first lens unit 110, while the third lens unit 130 will also be far away from the fourth lens unit 140.

Figure 10:
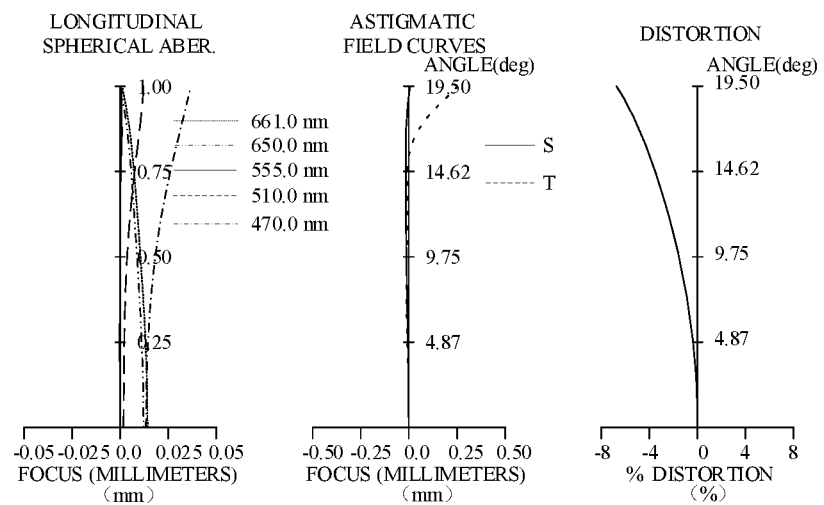
FIG. 10 is a longitudinal spherical aberration diagram, an astigmatism diagram, and a distortion diagram of the optical system at the short focal end corresponding to FIG. 7 according to the second embodiment.
Figure 11:
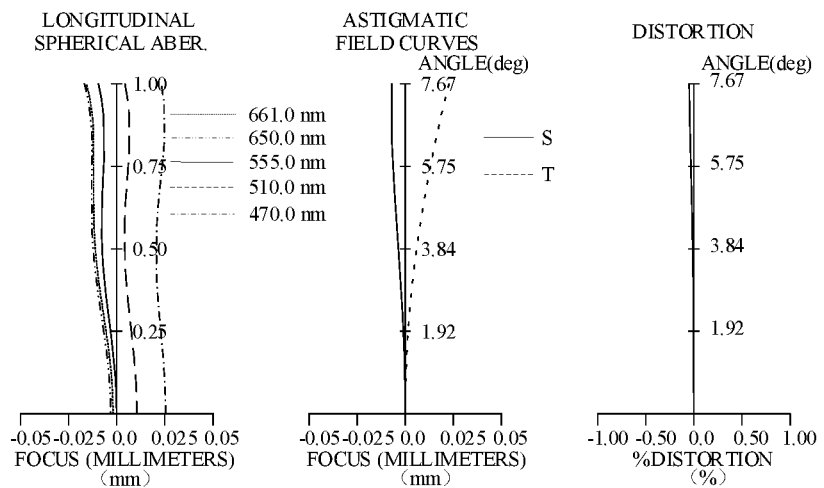
FIG. 11 is a longitudinal spherical aberration diagram, an astigmatism diagram, and a distortion diagram of the optical system at the middle focal end corresponding to FIG. 8 according to the second embodiment.
Figure 12:
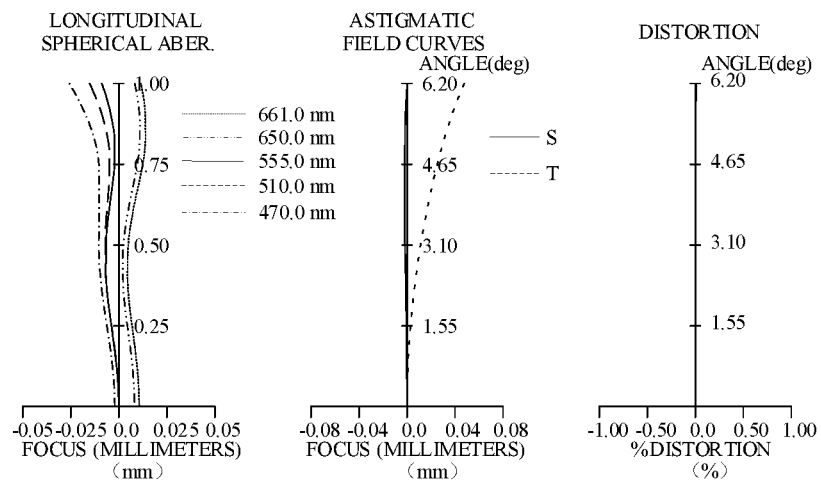
FIG. 12 is a longitudinal spherical aberration diagram, an astigmatism diagram, and a distortion diagram of the optical system at the long focal end corresponding to FIG. 9 according to the second embodiment.

FIG. 7 is a schematic view of the optical system 10 at the short focal end according to the second embodiment; FIG. 8 is a schematic view of the optical system 10 at the middle focal end according to the second embodiment; FIG. 9 is a schematic view of the optical system 10 at the long focal end according to the second embodiment. FIG. 10 is a longitudinal spherical aberration diagram (mm), an astigmatism diagram (mm) and a distortion diagram (%) when the optical system 10 is at the corresponding short focal end of FIG. 7; FIG. 11 is a longitudinal spherical aberration diagram (mm), an astigmatism diagram (mm), and a distortion diagram (mm) at the corresponding middle focal end of FIG. 8; FIG. 12 is a longitudinal spherical aberration diagram (mm), an astigmatism diagram (mm), and a distortion diagram (mm) at the corresponding long focal end of FIG. 9.

The object side surface S1 of the first lens L1 is convex at the paraxial position, and the image side surface S2 is convex at the paraxial position; the object side surface S1 is convex at a circumference position, and the image side surface S2 is convex at a circumference position.

The object side surface S3 of the second lens L2 is concave at the paraxial position, and the image side surface S4 is concave at the paraxial position; the object side surface S3 is concave at a circumference position, and the image side surface S4 is concave at a circumference position.

The object side surface S5 of the third lens L3 is convex at the paraxial position, and the image side surface S6 is concave at the paraxial position; the object side surface S5 is concave at a circumference position, and the image side surface S6 is concave at a circumference position.

The object side surface S7 of the fourth lens L4 is convex at the paraxial position, and the image side surface S8 is concave at the paraxial position; the object side surface S7 is convex at a circumference position, and the image side surface S8 is convex at a circumference position.

The object side surface S9 of the fifth lens L5 is convex at the paraxial position, and the image side surface S10 is convex at the paraxial position; the object side surface S9 is convex at a circumference position, and the image side surface S10 is convex at a circumference position.

The object side surface S11 of the sixth lens L6 is convex at the paraxial position, and the image side surface S12 is concave at the paraxial position; the object side surface S11 is convex at a circumference position, and the image side surface S12 is concave at a circumference position.

The object side surface S13 of the seventh lens L7 is convex at the paraxial position, and the image side surface S14 is concave at the paraxial position; the object side surface S13 is convex at a circumference position, and the image side surface S14 is concave at a circumference position.

The object side surface S15 of the eighth lens L8 is convex at the paraxial position, and the image side surface S16 is concave at the paraxial position; the object side surface S15 is concave at a circumference position, and the image side surface S16 is convex at a circumference position.

In addition, the lens parameters of the optical system 10 in the second embodiment are given in Table 4, Table 5, and Table 6, and the definitions of the structures and parameters may be given in the first embodiment, which will not be described herein again.

TABLE 4

Second Embodiment
F = 10.6 mm~26 mm~32.2 mm, FNO = 3.61~4.73~5.05, FOV = 14.35°~5.75°~4.65°, TTL = 42.5 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| | Object Surface | Spherical Surface | Infinite | Infinite | | | | |
| 1 | First Fens | Spherical Surface | 24.8176 | 1.2181 | Glass | 1.618 | 63.39 | 29.398927 |
| 2 | | Spherical Surface | −67.2620 | D1 | | | | |
| 3 | Second Lens | Spherical Surface | −361.9627 | 0.3540 | Glass | 1.755 | 27.58 | −17.79585 |

TABLE 4-continued

Second Embodiment
F = 10.6 mm~26 mm~32.2 mm, FNO = 3.61~4.73~5.05, FOV = 14.35°~5.75°~4.65°, TTL = 42.5 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| 4 | | Spherical Surface | 14.0584 | 0.5768 | | | | |
| 5 | Third Lens | Aspheric Surface | 15.0868 | 0.6000 | Plastic | 1.544 | 56.11 | −17.241401 |
| 6 | | Aspheric Surface | 5.7149 | 1.1742 | | | | |
| 7 | Fourth Lens | Aspheric Surface | 8.5160 | 0.8620 | Plastic | 1.671 | 19.24 | 24.834496 |
| 8 | | Aspheric Surface | 16.5376 | D2 | | | | |
| 9 | Fifth Lens | Spherical Surface | 8.6527 | 1.0000 | Glass | 1.618 | 63.39 | 11.282062 |
| 10 | | Spherical Surface | −34.8295 | 0.0300 | | | | |
| 11 | Sixth Lens | Spherical Surface | 6.6306 | 1.0000 | Glass | 1.658 | 50.88 | 15.787935 |
| 12 | | Spherical Surface | 17.1027 | 0.2353 | | | | |
| 13 | Seventh Lens | Spherical Surface | 682.3950 | 1.5415 | Glass | 1.717 | 29.62 | −6.668472 |
| 14 | | Spherical Surface | 4.7746 | 0.4621 | | | | |
| 15 | Flare Stop | Spherical Surface | Infinite | D3 | | | | |
| 16 | Eighth Lens | Aspheric Surface | 12.2451 | 0.8741 | Plastic | 1.544 | 56.11 | 23.522834 |
| 17 | | Aspheric Surface | 256.8898 | 11.5277 | | | | |
| 18 | Infrared Cut Filter | Spherical Surface | Infinite | 0.2100 | Glass | 1.517 | 64.17 | |
| 19 | | Spherical Surface | Infinite | 0.9476 | | | | |
| | Image Surface | Spherical Surface | Infinite | 0.0000 | | | | |

TABLE 5

| Variable Distance | Short Focal Position | Middle Focal Position | Long Focal Position |
|---|---|---|---|
| D1 | 0.0300 | 5.5694 | 6.6095 |
| D2 | 19.3615 | 4.2010 | 0.4000 |
| D3 | 0.5000 | 10.1110 | 12.8770 |

TABLE 6

| Surface Number | 5 | 6 | 7 | 8 | 16 | 17 |
|---|---|---|---|---|---|---|
| K | 0.00E+00 | 0.00E+00 | 0.00E+00 | 0.00E+00 | 0.00E+00 | 0.00E+00 |
| A4 | −2.30E−03 | −2.73E−03 | −7.00E−04 | −7.70E−04 | −2.60E−04 | −1.90E−04 |
| A6 | 9.00E−05 | 8.00E−05 | 3.00E−05 | 4.00E−05 | −1.00E−05 | −1.00E−05 |
| A8 | 0.00E+00 | 0.00E+00 | 0.00E+00 | 0.00E+00 | 0.00E+00 | 0.00E+00 |
| A10 | 0.00E+00 | 0.00E+00 | 0.00E+00 | 0.00E+00 | 0.00E+00 | 0.00E+00 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

In this embodiment, the optical system 10 satisfies the following condition:

| fc/fd | 3.04 | f2/fc | −0.42 |
| (g1 + g2 + g3 + g4)/fd | 0.89 | d2/d3 | 0.53 |
| f3/fd | 1.87 | TTL/fc | 1.32 |
| f1/|f2| | 2.15 | R16/f4 | 0.52 |

Third Embodiment

Figure 13:
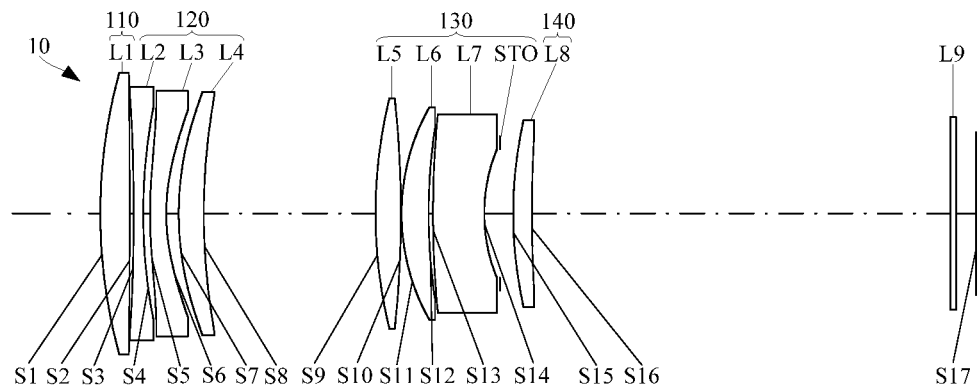
FIG. 13 is a schematic view of the optical system at the short focal end according to a third embodiment of the present disclosure.
Figure 14:
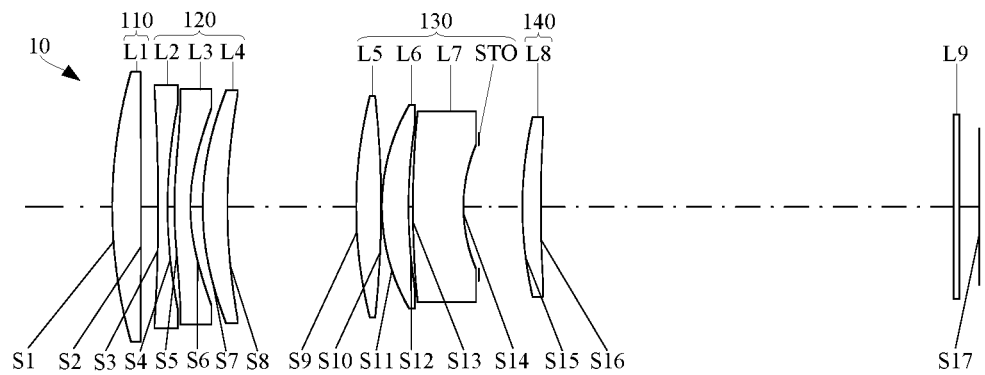
FIG. 14 is a schematic view of the optical system at the middle focal end according to the third embodiment of the present disclosure.
Figure 15:
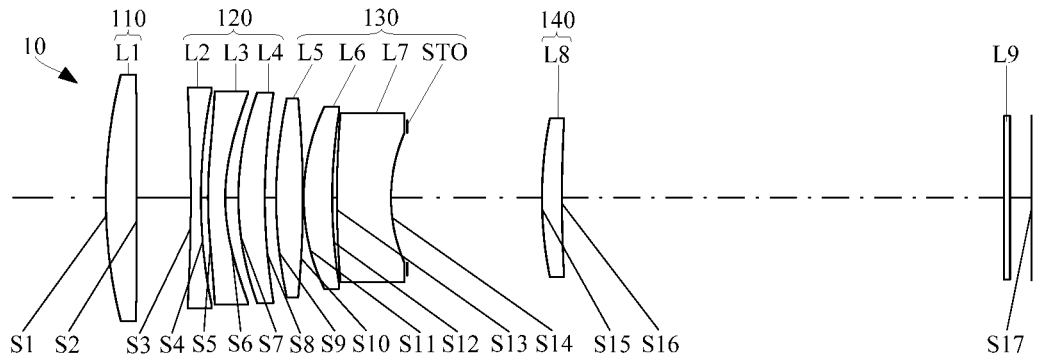
FIG. 15 is a schematic view of the optical system at the long focal end according to the third embodiment of the present disclosure.

Referring to FIGS. 13, 14 and 15, in the third embodiment, the optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes, successively in order from the object side to the image side, a first lens L1, the second lens unit 120 includes a second lens L2, a third lens L3, and a fourth lens L4, and the third lens unit 130 includes, successively in order from the object side to the image side, a fifth lens L5, a sixth lens L6, a seventh lens L7, and a flare stop STO, the fourth lens unit 140 includes an eighth lens L8, and each of the first lens L1 to the eighth lens L8 includes only one lens. The first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and the eighth lens L8 has a positive refractive power. The first lens unit 110 and the fourth lens unit 140 are fixedly arranged with respect to the imaging surface of the optical system 120, the optical zoom is realized via movement of the second lens unit 120 and the third lens unit 130.

During the zooming process, the first lens L1 and the eighth lens L8 always remain fixed in the system, while the second lens L2, the third lens L3, and the fourth lens L4 can be fixed together by a clamping member and move synchronously along the optical axis direction of the optical system 10 as a whole, the fifth lens L5, the sixth lens L6, the seventh lens L7 and the flare stop STO can be fixed together by a clamping member and move synchronously along the optical axis direction of the optical system 10 as a whole. When the optical system 10 gradually switches from the short focal end to the long focal end, the second lens unit 120 will be far away from the first lens unit 110, while the third lens unit 130 will also be far away from the fourth lens unit 140.

Figure 16:
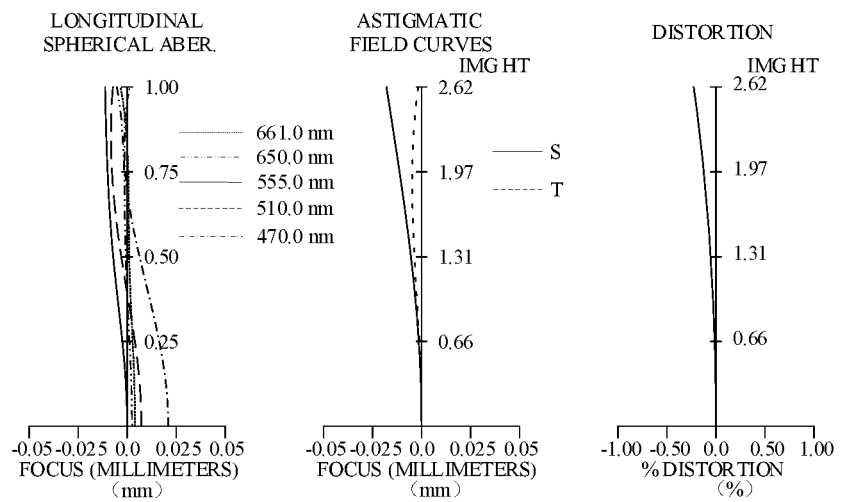
FIG. 16 is a longitudinal spherical aberration diagram, an astigmatism diagram, and a distortion diagram of the optical system at the short focal end corresponding to FIG. 13 according to the third embodiment.
Figure 17:
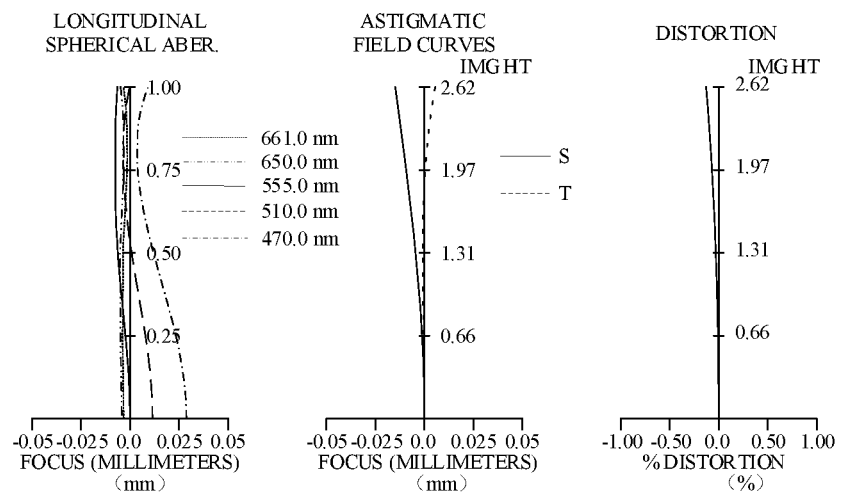
FIG. 17 is a longitudinal spherical aberration diagram, an astigmatism diagram, and a distortion diagram of the optical system at the middle focal end corresponding to FIG. 14 according to the third embodiment.
Figure 18:
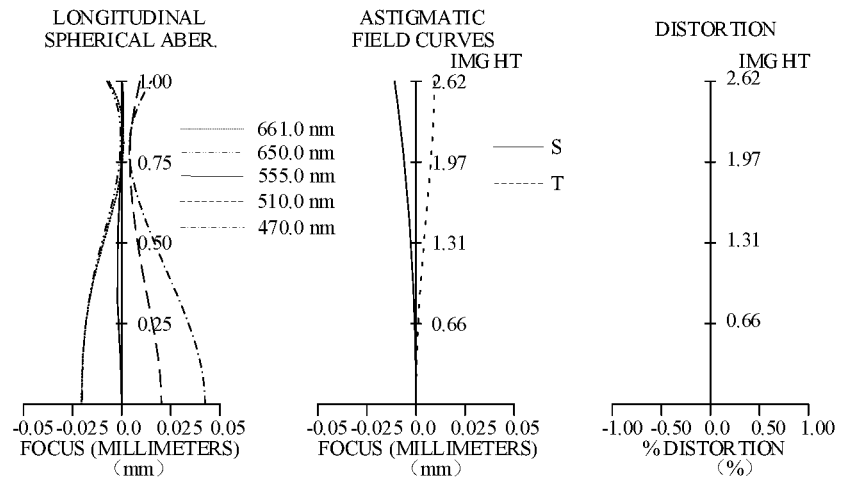
FIG. 18 is a longitudinal spherical aberration diagram, an astigmatism diagram, and a distortion diagram of the optical system at the long focal end corresponding to FIG. 15 according to the third embodiment.

FIG. 13 is a schematic view of the optical system 10 at the short focal end according to the third embodiment; FIG. 14 is a schematic view of the optical system 10 at the middle focal end according to the third embodiment; FIG. 15 is a schematic view of the optical system 10 at the long focal end according to the third embodiment. FIG. 16 is a longitudinal spherical aberration diagram (mm), an astigmatism diagram (mm) and a distortion diagram (%) when the optical system 10 is at the corresponding short focal end of FIG. 13; FIG. 17 is a longitudinal spherical aberration diagram (mm), an astigmatism diagram (mm), and a distortion diagram (mm) at the corresponding middle focal end of FIG. 14; FIG. 18 is a longitudinal spherical aberration diagram (mm), an astigmatism diagram (mm), and a distortion diagram (mm) at the corresponding long focal end of FIG. 15.

The object side surface S1 of the first lens L1 is convex at the paraxial position, and the image side surface S2 is convex at the paraxial position; the object side surface S1 is convex at a circumference position, and the image side surface S2 is convex at a circumference position.

The object side surface S3 of the second lens L2 is concave at the paraxial position, and the image side surface S4 is concave at the paraxial position; the object side surface S3 is concave at a circumference position, and the image side surface S4 is concave at a circumference position.

The object side surface S5 of the third lens L3 is convex at the paraxial position, and the image side surface S6 is concave at the paraxial position; the object side surface S5 is concave at a circumference position, and the image side surface S6 is concave at a circumference position.

The object side surface S7 of the fourth lens L4 is convex at the paraxial position, and the image side surface S8 is concave at the paraxial position; the object side surface S7 is convex at a circumference position, and the image side surface S8 is concave at a circumference position.

The object side surface S9 of the fifth lens L5 is convex at the paraxial position, and the image side surface S10 is convex at the paraxial position; the object side surface S9 is convex at a circumference position, and the image side surface S10 is convex at a circumference position.

The object side surface S11 of the sixth lens L6 is convex at the paraxial position, and the image side surface S12 is concave at the paraxial position; the object side surface S11 is convex at a circumference position, and the image side surface S12 is concave at a circumference position.

The object side surface S13 of the seventh lens L7 is convex at the paraxial position, and the image side surface S14 is concave at the paraxial position; the object side surface S13 is convex at a circumference position, and the image side surface S14 is concave at a circumference position.

The object side surface S15 of the eighth lens L8 is convex at the paraxial position, and the image side surface S16 is concave at the paraxial position; the object side surface S15 is convex at a circumference position, and the image side surface S16 is concave at a circumference position.

In addition, the lens parameters of the optical system 10 in the third embodiment are given in Table 7, Table 8, and Table 9, and the definitions of the structures and parameters may be given in Embodiment 1, which will not be described herein again.

TABLE 7

Third Embodiment
F = 20.0 mm~22.0 mm~28.5 mm, FNO = 4.17~4.28~4.61, FOV = 7.48°~6.8°~5.25°, TTL = 32.5 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
|  | Object Surface | Spherical Surface | Infinite | Infinite |  |  |  |  |
| 1 | First Lens | Spherical Surface | 14.9418 | 1.0839 | Glass | 1.618 | 63.39 | 23.287536 |

TABLE 7-continued

Third Embodiment
F = 20.0 mm~22.0 mm~28.5 mm, FNO = 4.17~4.28~4.61, FOV = 7.48°~6.8°~5.25°, TTL = 32.5 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| 2 |  | Spherical Surface | −412.2696 | D1 |  |  |  |  |
| 3 | Second Lens | Spherical Surface | −53.9572 | 0.3540 | Glass | 1.755 | 27.58 | −15.920773 |
| 4 |  | Spherical Surface | 15.6453 | 0.2535 |  |  |  |  |
| 5 | Third Lens | Aspheric Surface | 12.5951 | 0.6000 | Plastic | 1.544 | 56.11 | −19.106705 |
| 6 |  | Aspheric Surface | 5.6097 | 0.4644 |  |  |  |  |
| 7 | Fourth Lens | Aspheric Surface | 8.6946 | 0.9264 | Plastic | 1.671 | 19.24 | 25.209106 |
| 8 |  | Aspheric Surface | 16.9475 | D2 |  |  |  |  |
| 9 | Fifth Lens | Spherical Surface | 13.6415 | 0.9379 | Glass | 1.618 | 63.39 | 15.326524 |
| 10 |  | Spherical Surface | −30.4589 | 0.0300 |  |  |  |  |
| 11 | Sixth Lens | Spherical Surface | 6.1880 | 1.0000 | Glass | 1.658 | 50.88 | 14.704114 |
| 12 |  | Spherical Surface | 15.9444 | 0.1665 |  |  |  |  |
| 13 | Seventh Lens | Spherical Surface | 29.2763 | 1.9000 | Glass | 1.717 | 29.62 | −8.238748 |
| 14 |  | Spherical Surface | 4.8078 | 0.5743 |  |  |  |  |
| 15 | Flare Stop | Spherical Surface | Infinite | D3 |  |  |  |  |
| 16 | Eighth Lens | Aspheric Surface | 11.8479 | 0.6965 | Plastic | 1.544 | 56.11 | 29.938271 |
| 17 |  | Aspheric Surface | 42.1727 | 15.5277 |  |  |  |  |
| 18 | Infrared Cut Filter | Spherical Surface | Infinite | 0.2100 | Glass | 1.517 | 64.17 |  |
| 19 |  | Spherical Surface | Infinite | 0.7468 |  |  |  |  |
|  | Image Surface | Spherical Surface | Infinite | 0.0000 |  |  |  |  |

TABLE 8

| Variable Distance | Short Focal Position | Middle Focal Position | Long Focal Position |
|---|---|---|---|
| D1 | 0.1537 | 0.6436 | 1.9016 |
| D2 | 6.3794 | 4.8442 | 0.4000 |
| D3 | 0.5000 | 1.6403 | 4.7265 |

TABLE 9

| Surface Number | 5 | 6 | 7 | 8 | 16 | 17 |
|---|---|---|---|---|---|---|
| K | 0.00E+00 | 0.00E+00 | 0.00E+00 | 0.00E+00 | 0.00E+00 | 0.00E+00 |
| A4 | −2.54E−03 | −2.71E−03 | −1.00E−05 | −3.60E−04 | 9.00E−05 | 1.60E−04 |
| A6 | 7.00E−05 | 4.00E−05 | 0.00E+00 | 3.00E−05 | −2.00E−05 | −2.00E−05 |
| A8 | 0.00E+00 | 0.00E+00 | 0.00E+00 | 0.00E+00 | 0.00E+00 | 0.00E+00 |
| A10 | 0.00E+00 | 0.00E+00 | 0.00E+00 | 0.00E+00 | 0.00E+00 | 0.00E+00 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

In this embodiment, the optical system 10 satisfies the following condition:

| fc/fd | 1.43 | f2/fc | −0.45 |
| --- | --- | --- | --- |
| (g1 + g2 + g3 + g4)/fd | 0.42 | d2/d3 | 0.41 |
| f3/fd | 0.96 | TTL/fc | 1.14 |
| f1/\|f2\| | 1.82 | R16/f4 | 0.40 |

Fourth Embodiment

Figure 19:
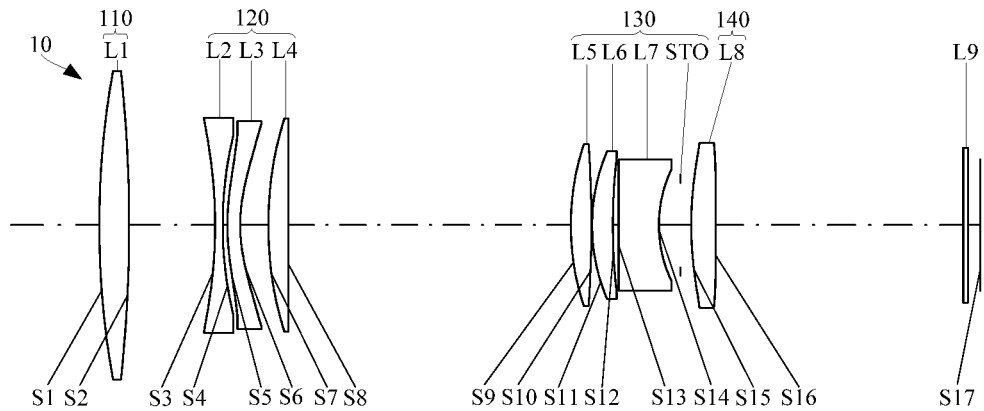
FIG. 19 is a schematic view of the optical system at the short focal end according to a fourth embodiment of the present disclosure.
Figure 20:
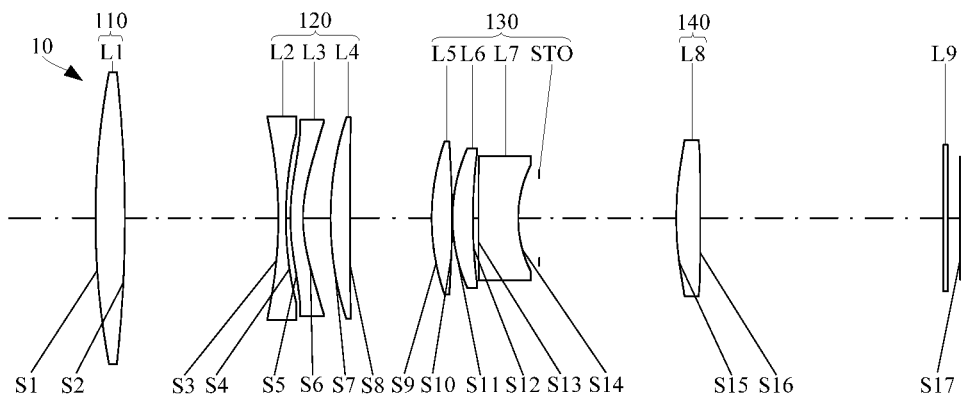
FIG. 20 is a schematic view of the optical system at the middle focal end according to the fourth embodiment of the present disclosure.
Figure 21:
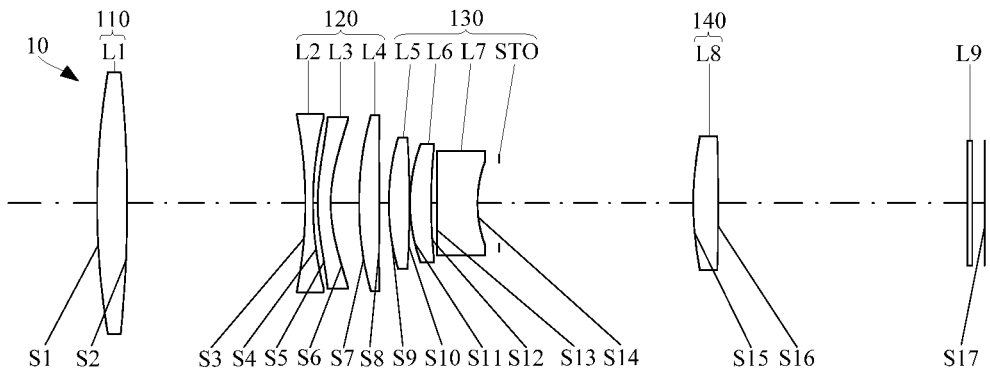
FIG. 21 is a schematic view of the optical system at the long focal end according to the fourth embodiment the present disclosure.

Referring to FIGS. 19, 20 and 21, in the fourth embodiment, the optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes a first lens L1, the second lens unit 120 includes, successively in order from the object side to the image side, a second lens L2, a third lens L3, and a fourth lens L4, and the third lens unit 130 includes, successively in order from the object side to the image side, a fifth lens L5, a sixth lens L6, a seventh lens L7, and a flare stop STO, the fourth lens unit 140 includes an eighth lens L8, and each of the first lens L1 to the eighth lens L8 includes only one lens. The first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and eighth lens L8 has a positive refractive power. The first lens unit 110 and the fourth lens unit 140 are fixedly arranged with respect to the imaging surface of the optical system 120, the optical zoom is realized via movement of the second lens unit 120 and the third lens unit 130.

During the zooming process, the first lens L1 and the eighth lens L8 always remain fixed in the system, while the second lens L2, the third lens L3, and the fourth lens L4 can be fixed together by a clamping member and move synchronously along the optical axis direction of the optical system 10 as a whole, the fifth lens L5, the sixth lens L6, the seventh lens L7 and the flare stop STO can be fixed together by a clamping member and move synchronously along the optical axis direction of the optical system 10 as a whole. When the optical system 10 gradually switches from the short focal end to the long focal end, the second lens unit 120 will be far away from the first lens unit 110, while the third lens unit 130 will also be far away from the fourth lens unit 140.

Figure 22:
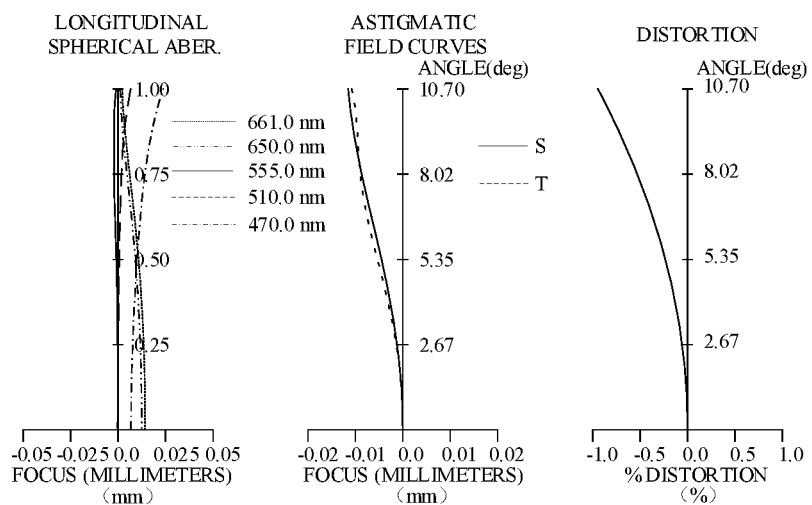
FIG. 22 is a longitudinal spherical aberration diagram, an astigmatism diagram, and a distortion diagram of the optical system at the short focal end corresponding to FIG. 19 according to the fourth embodiment.
Figure 23:
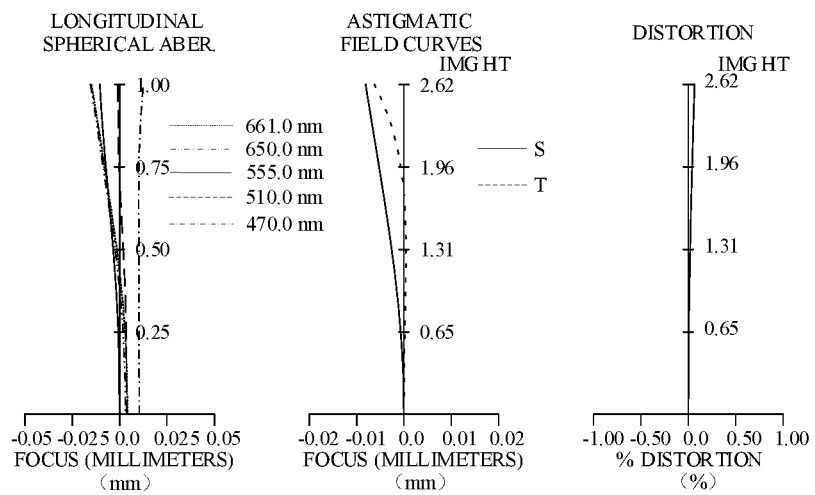
FIG. 23 is a longitudinal spherical aberration diagram, an astigmatism diagram, and a distortion diagram of the optical system at the middle focal end corresponding to FIG. 20 according to the fourth embodiment.
Figure 24:
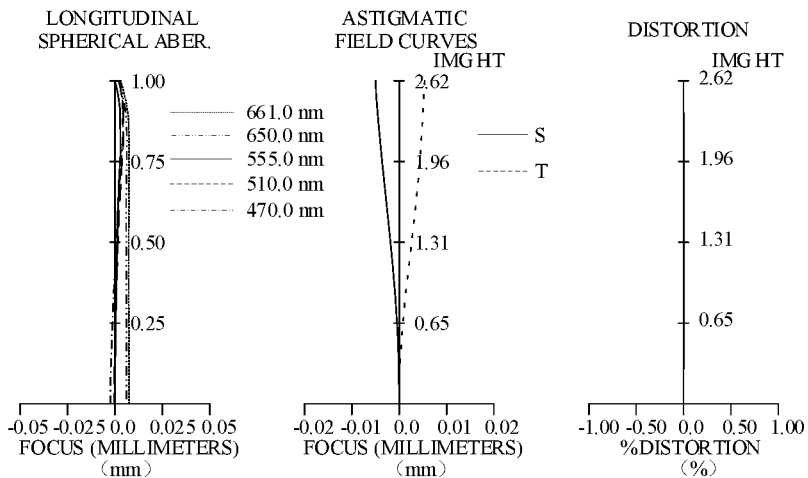
FIG. 24 is a longitudinal spherical aberration diagram, an astigmatism diagram, and a distortion diagram of the optical system at the long focal end corresponding to FIG. 21 according to the fourth embodiment.

FIG. 19 is a schematic view of the optical system 10 at the short focal end according to the fourth embodiment; FIG. 20 is a schematic view of the optical system 10 at the middle focal end according to the fourth embodiment; FIG. 21 is a schematic view of the optical system 10 at the long focal end according to the fourth embodiment. FIG. 22 is a longitudinal spherical aberration diagram (mm), an astigmatism diagram (mm) and a distortion diagram (%) when the optical system 10 is at the corresponding short focal end of FIG. 19; FIG. 23 is a longitudinal spherical aberration diagram (mm), an astigmatism diagram (mm) and a distortion diagram (mm) at the corresponding middle focal end of FIG. 20; FIG. 24 is a longitudinal spherical aberration diagram (mm), an astigmatism diagram (mm) and a distortion diagram (mm) at the corresponding long focal end of FIG. 21.

The object side surface S1 of the first lens L1 is convex at the paraxial position, and the image side surface S2 is convex at the paraxial position; the object side surface S1 is convex at a circumference position, and the image side surface S2 is convex at a circumference position.

The object side surface S3 of the second lens L2 is concave at the paraxial position, and the image side surface S4 is concave at the paraxial position; the object side surface S3 is concave at a circumference position, and the image side surface S4 is concave at a circumference position.

The object side surface S5 of the third lens L3 is convex at the paraxial position, and the image side surface S6 is concave at the paraxial position; the object side surface S5 is concave at a circumference position, and the image side surface S6 is concave at a circumference position.

The object side surface S7 of the fourth lens L4 is convex at the paraxial position, and the image side surface S8 is convex at the paraxial position; the object side surface S7 is convex at a circumference position, and the image side surface S8 is concave at a circumference position.

The object side surface S9 of the fifth lens L5 is convex at the paraxial position, and the image side surface S10 is convex at the paraxial position; the object side surface S9 is convex at a circumference position, and the image side surface S10 is convex at a circumference position.

The object side surface S11 of the sixth lens L6 is convex at the paraxial position, and the image side surface S12 is concave at the paraxial position; the object side surface S11 is convex at a circumference position, and the image side surface S12 is concave at a circumference position.

The object side surface S13 of the seventh lens L7 is convex at the paraxial position, and the image side surface S14 is concave at the paraxial position; the object side surface S13 is convex at a circumference position, and the image side surface S14 is concave at a circumference position.

The object side surface S15 of the eighth lens L8 is convex at the paraxial position, and the image side surface S16 is convex at the paraxial position; the object side surface S15 is convex at a circumference position, and the image side surface S16 is convex at a circumference position.

In addition, the lens parameters of the optical system 10 in the fourth embodiment are given in Table 10, Table 11, and Table 12, and the definitions of the structures and parameters may be given in Embodiment 1, which will not be described herein again.

TABLE 10

Fourth Embodiment
F = 14.0 mm~24.0 mm~29.0 mm, FNO = 3.89~4.59~4.87, FOV = 10.7°~6.23°~5.16°, TTL = 41 mm

| Surface Number | Surface Name | Surface Type | Radius Y (Mm) | Thickness (Mm) | Material | Refractive index | Abbe Number | Focal Length (Mm) |
| --- | --- | --- | --- | --- | --- | --- | --- | --- |
|  | Object Surface | Spherical Surface | Infinite | Infinite |  |  |  |  |
| 1 | First Lens | Spherical Surface | 30.8801 | 1.3909 | Glass | 1.618 | 63.39 | 30.677809 |
| 2 |  | Spherical Surface | −48.6258 | D1 |  |  |  |  |

TABLE 10-continued

Fourth Embodiment
F = 14.0 mm~24.0 mm~29.0 mm, FNO = 3.89~4.59~4.87, FOV = 10.7°~6.23°~5.16°, TTL = 41 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| 3 | Second Lens | Spherical Surface | −16.5401 | 0.3540 | Glass | 1.755 | 27.58 | −9.755867 |
| 4 | | Spherical Surface | 13.5672 | 0.2165 | | | | |
| 5 | Third Lens | Aspheric Surface | 8.3278 | 0.6000 | Plastic | 1.544 | 56.11 | −35.72126 |
| 6 | | Aspheric Surface | 5.6872 | 1.3078 | | | | |
| 7 | Fourth Lens | Aspheric Surface | 13.3302 | 0.9294 | Plastic | 1.671 | 19.24 | 19.177525 |
| 8 | | Aspheric Surface | −500.0000 | D2 | | | | |
| 9 | Fifth Lens | Spherical Surface | 9.0164 | 0.9605 | Glass | 1.618 | 63.39 | 11.955392 |
| 10 | | Spherical Surface | −39.8867 | 0.0300 | | | | |
| 11 | Sixth Lens | Spherical Surface | 6.6668 | 0.9643 | Glass | 1.658 | 50.88 | 14.575308 |
| 12 | | Spherical Surface | 20.4131 | 0.2647 | | | | |
| 13 | Seventh Lens | Spherical Surface | 600.0000 | 1.8793 | Glass | 1.717 | 29.62 | −6.395981 |
| 14 | | Spherical Surface | 4.5749 | 1.0018 | | | | |
| 15 | Flare Stop | Spherical Surface | Infinite | D3 | | | | |
| 16 | Eighth Lens | Aspheric Surface | 11.8733 | 1.1434 | Plastic | 1.544 | 56.11 | 21.340796 |
| 17 | | Aspheric Surface | −600.0000 | 11.5277 | | | | |
| 18 | Infrared Cut Filter | Spherical Surface | Infinite | 0.2100 | Glass | 1.517 | 64.17 | |
| 19 | | Spherical Surface | Infinite | 0.5780 | | | | |
| | Image Surface | Spherical Surface | Infinite | 0.0000 | | | | |

TABLE 11

| Variable Distance | Short Focal Position | Middle Focal Position | Long Focal Position |
|---|---|---|---|
| D1 | 4.0000 | 7.2785 | 8.2312 |
| D2 | 13.1467 | 3.8640 | 0.4421 |
| D3 | 0.5000 | 6.4943 | 8.9684 |

TABLE 12

| Surface Number | 5 | 6 | 7 | 8 | 16 | 17 |
|---|---|---|---|---|---|---|
| K | 0.00E+00 | 0.00E+00 | 0.00E+00 | 0.00E+00 | 0.00E+00 | 0.00E+00 |
| A4 | −2.41E−03 | −2.99E−03 | −7.00E−04 | −9.00E−05 | −4.30E−04 | −3.60E−04 |
| A6 | 1.00E−05 | 2.00E−05 | 3.00E−05 | 3.00E−05 | −2.00E−05 | −2.00E−05 |
| A8 | 0.00E+00 | 0.00E+00 | 0.00E+00 | 0.00E+00 | 0.00E+00 | 0.00E+00 |
| A10 | 0.00E+00 | 0.00E+00 | 0.00E+00 | 0.00E+00 | 0.00E+00 | 0.00E+00 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

In this embodiment, the optical system 10 satisfies the following condition:

| fc/fd | 2.07 | f2/fc | −0.48 |
| (g1 + g2 + g3 + g4)/fd | 0.72 | d2/d3 | 0.50 |
| f3/fd | 1.44 | TTL/fc | 1.41 |
| f1/|f2| | 2.19 | R16/f4 | 0.56 |

Fifth Embodiment

Figure 25:
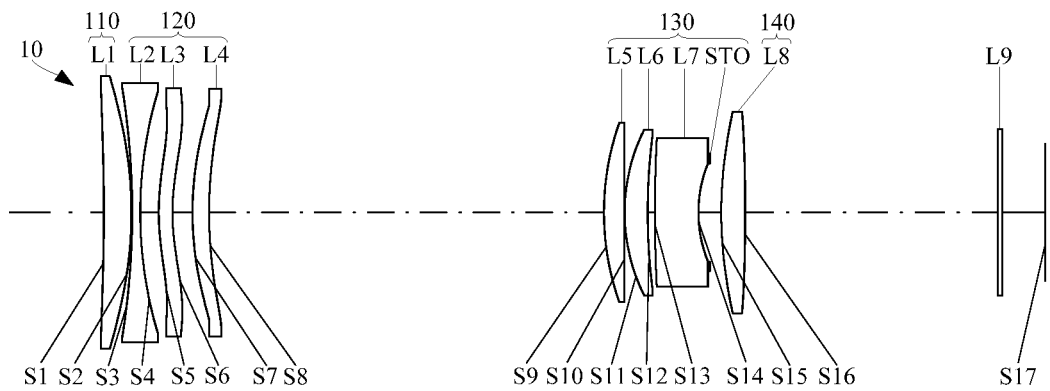
FIG. 25 is a schematic view of the optical system at the short focal end according to a fifth embodiment of the present disclosure.
Figure 26:
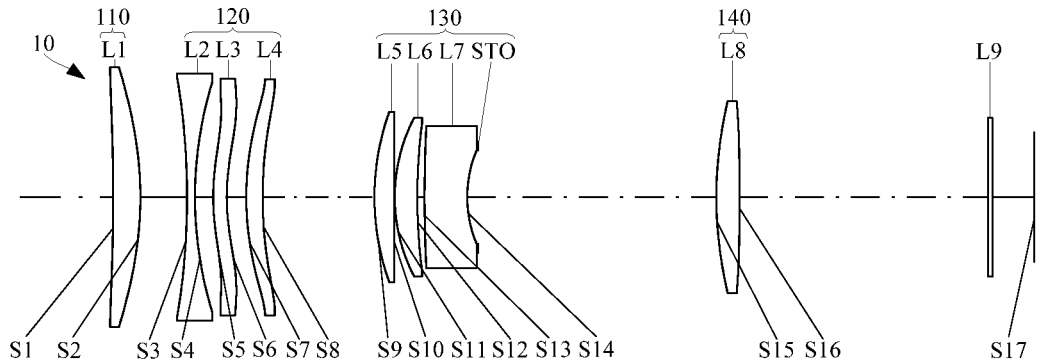
FIG. 26 is a schematic view of the optical system at the middle focal end according to the fifth embodiment of the present disclosure.
Figure 27:
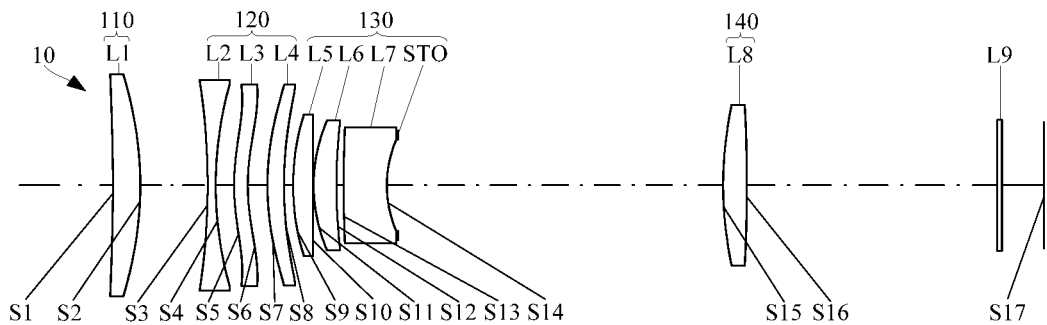
FIG. 27 is a schematic view of the optical system at the long focal end according to the fifth embodiment of the present disclosure.

Referring to FIGS. 25, 26 and 27, in the fifth embodiment, the optical system 10 includes, successively in order from the object side to the image side, a first lens unit 110 having positive refractive power and fixed arranged, a second lens unit 120 having negative refractive power and movable arranged, a third lens unit 130 having positive refractive power and movable arranged, and a fourth lens unit 140 having positive refractive power and fixed. The first lens unit 110 includes, successively in order from the object side to the image side, a first lens L1, the second lens unit 120 includes a second lens L2, a third lens L3, and a fourth lens L4, and the third lens unit 130 includes, successively in order from the object side to the image side, a fifth lens L5, a sixth lens L6, a seventh lens L7, and a flare stop STO, the fourth lens unit 140 includes an eighth lens L8, and each of the first lens L1 to the eighth lens L8 includes only one lens. The first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a positive refractive power, the seventh lens L7 has a negative refractive power, and the eighth lens L8 has a positive refractive power. The first lens unit 110 and the fourth lens unit 140 are fixedly arranged with respect to the imaging surface of the optical system 120, the optical zoom is realized via movement of the second lens unit 120 and the third lens unit 130.

During the zooming process, the first lens L1 and the eighth lens L8 always remain fixed in the system, while the second lens L2, the third lens L3, and the fourth lens L4 can be fixed together by a clamping member and move synchronously along the optical axis direction of the optical system 10 as a whole, the fifth lens L5, the sixth lens L6, the seventh lens L7 and the flare stop STO can be fixed together by a clamping member and move synchronously along the optical axis direction of the optical system 10 as a whole. When the optical system 10 gradually switches from the short focal end to the long focal end, the second lens unit 120 will be far away from the first lens unit 110, while the third lens unit 130 will also be far away from the fourth lens unit 140.

Figure 28:
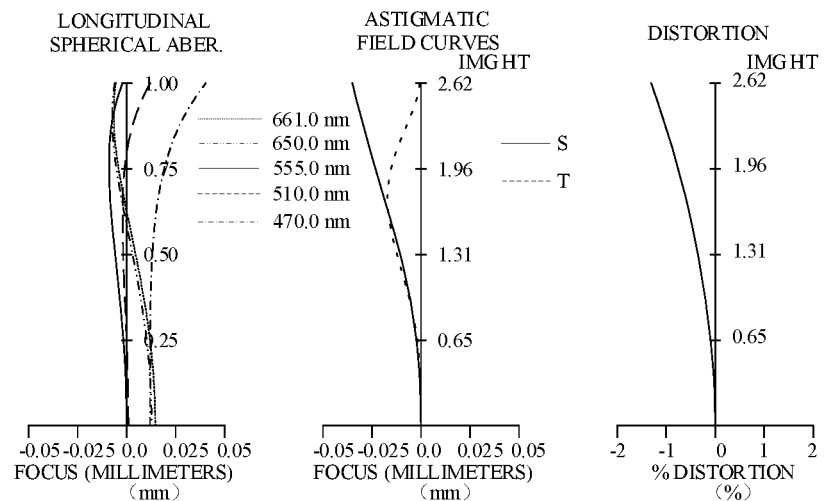
FIG. 28 is a longitudinal spherical aberration diagram, an astigmatism diagram, and a distortion diagram of the optical system at the short focal end corresponding to FIG. 25 according to the fifth embodiment.
Figure 29:
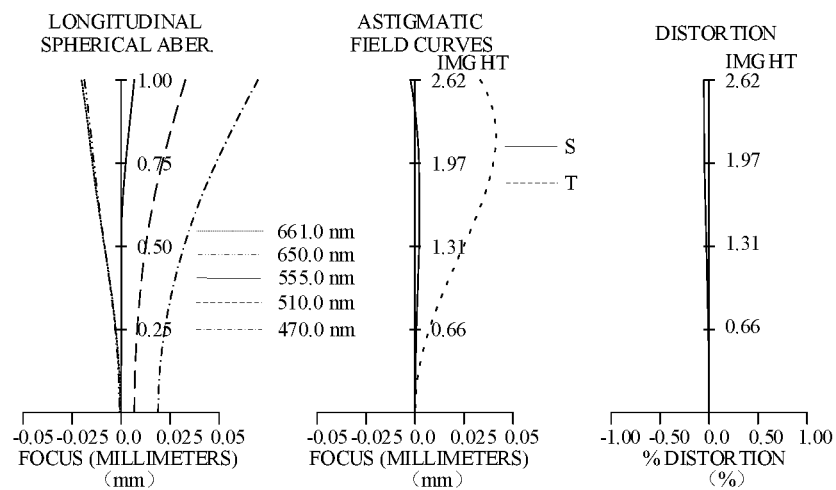
FIG. 29 is a longitudinal spherical aberration diagram, an astigmatism diagram, and a distortion diagram of the optical system at the middle focal end corresponding to FIG. 26 according to the fifth embodiment.
Figure 30:
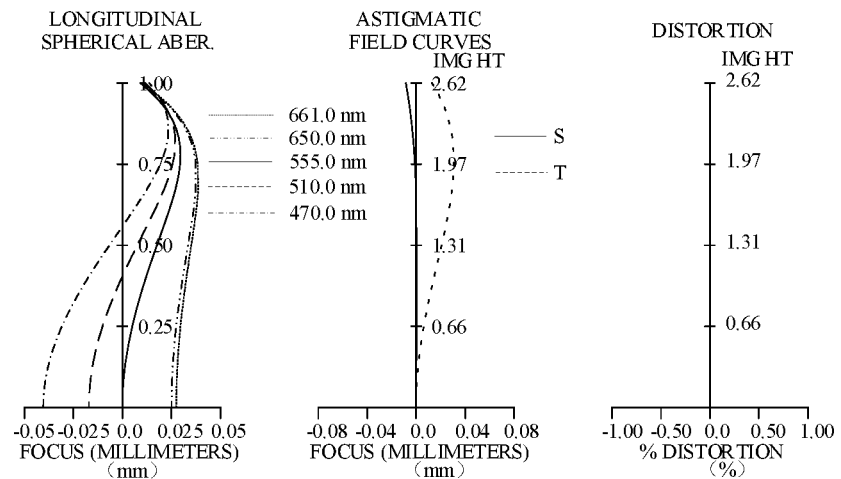
FIG. 30 is a longitudinal spherical aberration diagram, an astigmatism diagram, and a distortion diagram of the optical system at the long focal end corresponding to FIG. 27 according to the fifth embodiment.

FIG. 25 is a schematic view of the optical system 10 at the short focal end according to the fifth embodiment; FIG. 26 is a schematic view of the optical system 10 at the middle focal end according to the fifth embodiment; FIG. 27 is a schematic view of the optical system 10 at the long focal end according to the fifth embodiment. FIG. 28 is a longitudinal spherical aberration diagram (mm), an astigmatism diagram (mm) and a distortion diagram (%) when the optical system 10 is at the corresponding short focal end of FIG. 25; FIG. 29 is a longitudinal spherical aberration diagram (mm), an astigmatism diagram (mm) and a distortion diagram (mm) at the corresponding middle focal end of FIG. 26; FIG. 30 is a longitudinal spherical aberration diagram (mm), an astigmatism diagram (mm) and a distortion diagram (mm) at the corresponding long focal end of FIG. 27.

The object side surface S1 of the first lens L1 is convex at the paraxial position, and the image side surface S2 is convex at the paraxial position; the object side surface S1 is convex at a circumference position, and the image side surface S2 is convex at a circumference position.

The object side surface S3 of the second lens L2 is concave at the paraxial position, and the image side surface S4 is concave at the paraxial position; the object side surface S3 is concave at a circumference position, and the image side surface S4 is concave at a circumference position.

The object side surface S5 of the third lens L3 is convex at the paraxial position, and the image side surface S6 is concave at the paraxial position; the object side surface S5 is concave at a circumference position, and the image side surface S6 is convex at a circumference position.

The object side surface S7 of the fourth lens L4 is convex at the paraxial position, and the image side surface S8 is concave at the paraxial position; the object side surface S7 is convex at a circumference position, and the image side surface S8 is concave at a circumference position.

The object side surface S9 of the fifth lens L5 is convex at the paraxial position, and the image side surface S10 is concave at the paraxial position; the object side surface S9 is convex at a circumference position, and the image side surface S10 is concave at a circumference position.

The object side surface S11 of the sixth lens L6 is convex at the paraxial position, and the image side surface S12 is concave at the paraxial position; the object side surface S11 is convex at a circumference position, and the image side surface S12 is concave at a circumference position.

The object side surface S13 of the seventh lens L7 is convex at the paraxial position, and the image side surface S14 is concave at the paraxial position; the object side surface S13 is convex at a circumference position, and the image side surface S14 is concave at a circumference position.

The object side surface S15 of the eighth lens L8 is convex at the paraxial position, and the image side surface S16 is convex at the paraxial position; the object side surface S15 is convex at a circumference position, and the image side surface S16 is convex at a circumference position.

In addition, the lens parameters of the optical system 10 in the fifth embodiment are given in Table 13, Table 14, and Table 15, and the definitions of the structures and parameters may be given in Embodiment 1, which will not be described herein again.

TABLE 13

Fifth Embodiment
F = 12.9 mm~23.3 mm~29.0 mm, FNO = 3.69~4.7~5.08, FOV = 11.63°~6.41°~5.16°, TTL = 41 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| | Object Surface | Spherical Surface | Infinite | Infinite | | | | |
| 1 | First Lens | Spherical Surface | −73.4531 | 1.2089 | Glass | 1.618 | 63.39 | 25.649145 |
| 2 | | Spherical Surface | −13.5726 | D1 | | | | |

TABLE 13-continued

Fifth Embodiment
F = 12.9 mm~23.3 mm~29.0 mm, FNO = 3.69~4.7~5.08, FOV = 11.63°~6.41°~5.16°, TTL = 41 mm

| Surface Number | Surface Name | Surface Type | Radius Y (Mm) | Thickness (Mm) | Material | Refractive index | Abbe Number | Focal Length (Mm) |
|---|---|---|---|---|---|---|---|---|
| 3 | Second Lens | Spherical Surface | −27.1643 | 0.3540 | Glass | 1.755 | 27.58 | −12.43838 |
| 4 |  | Spherical Surface | 14.5843 | 0.8097 |  |  |  |  |
| 5 | Third Lens | Aspheric Surface | 8.6164 | 0.6000 | Plastic | 1.544 | 56.11 | −209.2662 |
| 6 |  | Aspheric Surface | 7.8151 | 0.8717 |  |  |  |  |
| 7 | Fourth Lens | Aspheric Surface | 11.2496 | 0.7277 | Plastic | 1.671 | 19.24 | 53.310456 |
| 8 |  | Aspheric Surface | 15.9112 | D2 |  |  |  |  |
| 9 | Fifth Lens | Spherical Surface | 9.3778 | 0.8745 | Glass | 1.618 | 63.39 | 15.224767 |
| 10 |  | Spherical Surface | 1464.2189 | 0.0300 |  |  |  |  |
| 11 | Sixth Lens | Spherical Surface | 6.4609 | 1.0000 | Glass | 1.658 | 50.88 | 13.70469 |
| 12 |  | Spherical Surface | 21.1580 | 0.3205 |  |  |  |  |
| 13 | Seventh Lens | Spherical Surface | 53.0806 | 1.9000 | Glass | 1.717 | 29.62 | −6.991823 |
| 14 |  | Spherical Surface | 4.5389 | 0.4938 |  |  |  |  |
| 15 | Flare Stop | Spherical Surface | Infinite | D3 |  |  |  |  |
| 16 | Eighth Lens | Aspheric Surface | 14.0449 | 1.0421 | Plastic | 1.544 | 56.11 | 22.083709 |
| 17 |  | Aspheric Surface | −82.9117 | 11.0300 |  |  |  |  |
| 18 | Infrared Cut Filter | Spherical Surface | Infinite | 0.2100 | Glass | 1.517 | 64.17 |  |
| 19 |  | Spherical Surface | Infinite | 1.8523 |  |  |  |  |
|  | Image Surface | Spherical Surface | Infinite | 0.0000 |  |  |  |  |

TABLE 14

| Variable Distance | Short Focal Position | Middle Focal Position | Long Focal Position |
|---|---|---|---|
| D1 | 0.0300 | 2.0795 | 2.9632 |
| D2 | 17.2450 | 4.9677 | 0.4000 |
| D3 | 0.5000 | 10.5777 | 14.3118 |

TABLE 15

| Surface Number | 5 | 6 | 7 | 8 | 16 | 17 |
|---|---|---|---|---|---|---|
| K | 0.00E+00 | 0.00E+00 | 0.00E+00 | 0.00E+00 | 0.00E+00 | 0.00E+00 |
| A4 | −2.55E−03 | −2.89E−03 | −2.70E−04 | −1.30E−04 | −2.40E−04 | −1.90E−04 |
| A6 | 0.00E+00 | 2.00E−05 | 3.00E−05 | 2.00E−05 | 0.00E+00 | 0.00E+00 |
| A8 | 0.00E+00 | 0.00E+00 | 0.00E+00 | 0.00E+00 | 0.00E+00 | 0.00E+00 |
| A10 | 0.00E+00 | 0.00E+00 | 0.00E+00 | 0.00E+00 | 0.00E+00 | 0.00E+00 |
| A12 | 0.00E+00 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 | 0.00E+00 |

In this embodiment, the optical system 10 satisfies the following condition:

| fc/fd | 2.25 | f2/fc | −0.51 |
|---|---|---|---|
| (g1 + g2 + g3 + g4)/fd | 0.79 | d2/d3 | 0.21 |
| f3/fd | 1.76 | TTL/fc | 1.41 |
| f1/|f2| | 1.74 | R16/f4 | 0.64 |

Figure 31:
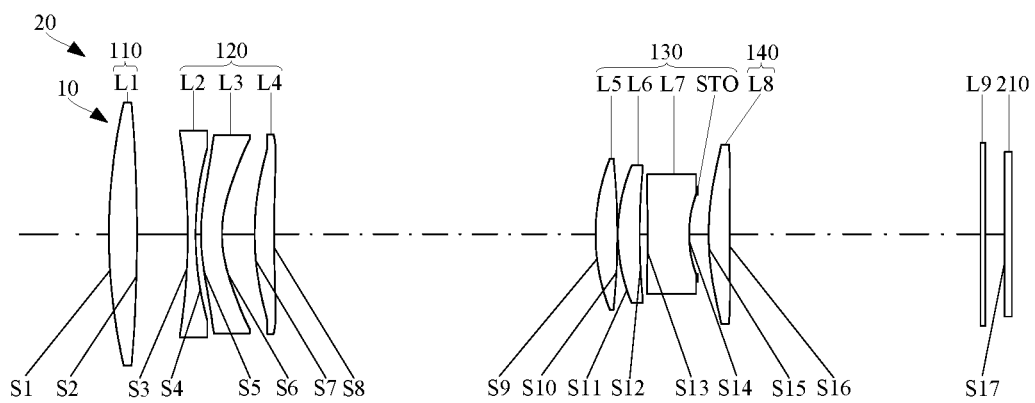
FIG. 31 is a schematic view of an imaging module according to an embodiment of the present disclosure.

Referring to FIG. 31, in an embodiment of the present disclosure, the optical system 10 is assembled with a photosensitive element 210 arranged on the image side of the fourth lens unit 140 to form an imaging module 20. Generally, the photosensitive surface of the photosensitive element 210 overlaps the imaging surface S17 of the optical system. The photosensitive element 210 may be a CCD (Charge Coupled Device) or CMOS (Complementary Metal Oxide Semiconductor). By using the aforementioned optical system 10, the imaging module 20 has excellent zoom performance, a zoom effect and a miniaturization design, and meanwhile, the collision between the fourth lens unit 140 and the photosensitive element 210 during assembly can be effectively prevented, thereby improving the assembly yield. In addition, the imaging module 20 can maintain good zoom performance in a long-term high temperature or low temperature environment.

In some embodiments, a protective glass and an infrared cut filter L9 are also provided between the fourth lens unit 140 and the imaging surface S17 of the system. The infrared cut filter L9 is used to filter out infrared light, and the protective glass is used to protect the photosensitive element 210. The protective glass and the infrared cut filter L9 may belong to a part of the optical system 210, or may be mounted between the optical system 210 and the photosensitive member 210 as a part of the module when the optical system 10 is assembled with the photosensitive member 210.

Figure 32:
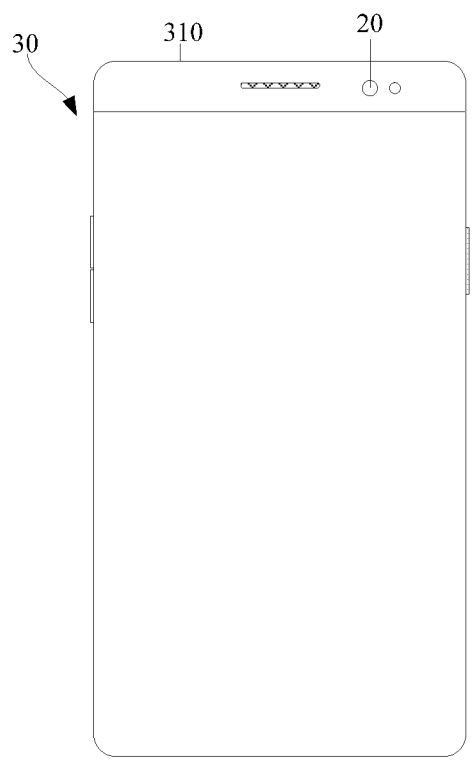
FIG. 32 is a schematic view of an electronic device according to an embodiment of the present disclosure.

Referring to FIG. 32, in some embodiments of the present disclosure, an electronic device 30 is further provided. The imaging module 20 is applied in the electronic device 30, such that the electronic device 30 has a zoom imaging function. Specifically, the electronic device 30 includes a fixing member 310 on which the imaging module 20 is mounted. In some embodiments, the fixing member 310 is a component such as a circuit board, a bezel, a housing or the like. The electronic device 30 may be, but is not limited to, a smartphone, a smart watch, an electronic book reader, a vehicle-mounted imaging device (such as a driving recorder), a monitoring device, a medical device, a notebook computer, a tablet computer, a biometric device (such as a fingerprint recognition device, a pupil recognition device and the like), a personal digital assistant (PDA), a drone, and the like. Specifically, in some embodiments, the electronic device 30 is a smartphone, the smartphone includes a middle frame and a circuit board, the circuit board is provided in the middle frame, the imaging module 20 is mounted in the middle frame of the smartphone, and the photosensitive element 210 therein is electrically connected to the circuit board. The imaging module 20 may serve as a pre-imaging module or a post-imaging module of the smartphone. By using the imaging module 20 provided in the embodiment of the present disclosure, the electronic device 30 will have excellent imaging performance and can assemble the imaging module 20 in a small space. In addition, the electronic device 30 can maintain good zoom performance in a long-term high temperature or low temperature environment.

In the description of the present disclosure, it should be understood that the azimuth or positional relationship indicated by the terms "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," "periphery" and the like are based on the azimuth or positional relationship shown in the accompanying drawings, only for the purpose of facilitating the description of the present disclosure and simplifying the description, and not that the device or element indicated or implied must have a particular azimuth, be constructed and operated in a particular azimuth, and therefore cannot be understood as a limitation on the present disclosure.

In addition, the terms "first" and "second" are only used for description purposes, and cannot be understood as indicating or implying relative importance or implicitly indicating the number of the indicated technical features. Therefore, the features defined with "first" and "second" may explicitly or implicitly include at least one of the features. In the description of the present disclosure, "plurality" means at least two, such as two, three, etc., unless otherwise specifically defined.

In the present disclosure, the terms "mounting," "connecting together," "connection," "fixing" and the like should be understood broadly, for example, which may be fixed connection, may be detachable connection, or may be integral; which may be a mechanical connection or an electrical connection; which may be directly connection or indirectly connection by an intermediate medium, may be a communication within two elements or an interaction between two elements, unless otherwise expressly defined. For those who skill in the art, the specific meaning of the aforementioned terms in the present disclosure can be understood according to specific situations.

In the present disclosure, unless expressly stipulated and defined otherwise, the "on" or "under" of the first feature on the second feature may be in direct contact with the first and second features, or the first and second features may be in indirectly contact via an intermediary. Moreover, the "above", "on" and "over" of the first feature on the second feature may mean that the first feature is directly above or obliquely above the second feature, or it simply means that the level of the first feature is higher than the second feature. The first feature "below", "under" and "underneath" the second feature can mean that the first feature is directly below or obliquely below the second feature, or it simply means that the level of the first feature is smaller than the second feature.

In the description of this specification, descriptions with reference to the terms "an embodiment", "some embodiments", "examples", "specific examples", or "some examples" etc. mean specific features, structures, materials or characteristics described in conjunction with the embodiment or example, are included in at least one embodiment or example of the present disclosure. In this specification, the schematic representations of the aforementioned terms do not necessarily refer to the same embodiment or example. Moreover, the described specific features, structures, materials or characteristics can be combined in any one or more embodiments or examples in a suitable manner. In addition, those who skilled in the art can combine and assemble the different embodiments or examples and the features of the different embodiments or examples described in this specification without contradicting each other.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementation of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. An optical system, comprising, successively from an object side to an image side:
   a first lens unit having positive refractive power;
   a second lens unit having negative refractive power;
   a third lens unit having positive refractive power; and
   a fourth lens unit having positive refractive power;
   wherein positions of the first lens unit and the fourth lens unit are fixed with respect to an imaging surface of the optical system, the second lens unit and the third lens unit are movable with respect to the first lens unit along an optical axis direction of the optical system, when the optical system is zoomed from a short focal end to a long focal end, a distance between the first lens unit and the second lens unit increases, and a distance between the third lens unit and the fourth lens unit also increases;
   wherein the optical system satisfies the following condition:

$$0.3 < (g1 + g2 + g3 + g4)/fd;$$

wherein g1 is a distance between a lens surface closest to the object side and a lens surface closest to the image side in the first lens unit on the optical axis, g2 is a distance between a lens surface closest to the object side and a lens surface closest to the image side in the second lens unit on the optical axis, g3 is a distance between a lens surface closest to the object side and a lens surface closest to the image side in the third lens unit on the optical axis, g4 is a distance between a lens surface closest to the object side and a lens surface closest to the image side in the fourth lens unit on the optical axis, and fd is the focal length of the optical system at the short focal end.

2. The optical system according to claim 1, satisfying the following condition:

$$1.2 < fc/fd < 3.5;$$

wherein fc is a focal length of the optical system at the long focal end, and fd is a focal length of the optical system at the short focal end.

3. The optical system according to claim 2, further satisfying the following condition:

$$1.43 \le fc/fd \le 3.04.$$

4. The optical system according to claim 1, satisfying the following condition:

$$0.42 \le (g1 + g2 + g3 + g4)/fd \le 0.89.$$

5. The optical system according to claim 1, satisfying the following condition:

$$0.8 < f3/fd < 2;$$

where f3 is a focal length of the third lens unit, and fd is the focal length of the optical system at the short focal end.

6. The optical system according to claim 5, further satisfying the following condition:

$$0.96 \le f3/fd \le 1.87.$$

7. The optical system according to claim 1, satisfying the following condition:

$$1.6 < f1/|f2| < 2.3;$$

wherein f1 is a focal length of the first lens unit, and f2 is a focal length of the second lens unit.

8. The optical system according to claim 7, satisfying the following condition:

$$1.74 \le f1/|f2| \le 2.19.$$

9. The optical system according to claim 1, satisfying the following condition:

$$-0.6 < f2/fc < -0.3;$$

where f2 is the focal length of the second lens unit, and fd is the focal length of the optical system at the long focal end.

10. The optical system according to claim 9, further satisfying the following condition:

$$-0.51 \le f2/fc \le -0.42.$$

11. The optical system according to claim 1, satisfying the following condition:

$$0.1 < d2/d3 < 0.6;$$

wherein d2 is a moving distance of the second lens unit when the optical system is zoomed from the short focal end to the long focal end, and d3 is a moving distance of the third lens unit when the optical system is zoomed from the short focal end to the long focal end.

12. The optical system according to claim 11, further satisfying the following condition:

$$0.21 \le d2/d3 \le 0.53.$$

13. The optical system according to claim 1, satisfying the following condition:

$$1 < TTL/fc < 1.5;$$

wherein TTL is a total optical length of the optical system, and fc is the focal length of the optical system at the long focal end.

14. The optical system according to claim 13, further satisfying the following condition:

$$1.14 \le TTL/fc \le 1.41.$$

15. The optical system according to claim 1, wherein the first lens unit comprises a first lens, the second lens unit comprises, successively in order from the object side to the image side: a second lens, a third lens and a fourth lens, the third lens unit comprises, successively in order from the object side to the image side: a fifth lens, a sixth lens and a seventh lens, and the fourth lens unit comprises an eighth lens.

16. The optical system according to claim 15, further satisfying the following condition:

$$0.3 < R16/f4 < 0.8;$$

where R16 is a curvature radius of the object side surface of the eighth lens at the optical axis, and f4 is a focal length of the fourth lens unit.

17. The optical system according to claim 16, further satisfying the following condition:

$$0.40 \le R16/f4 \le 0.64.$$

18. An imaging module, comprising a photosensitive element and the optical system according to claim 1, the photosensitive element being provided on the image side of the optical system.

19. An electronic device, comprising a fixing member and the imaging module according to claim 18, the imaging module being provided on the fixing member.

* * * * *